United States Patent
Vengroff et al.

(10) Patent No.: US 12,106,326 B2
(45) Date of Patent: Oct. 1, 2024

(54) DETERMINING LOCATIONS OF INTEREST BASED ON USER VISITS

(71) Applicant: Bytedance Inc., Wilmington, DE (US)

(72) Inventors: Darren E. Vengroff, Chicago, IL (US); Oliver B. Downs, Chicago, IL (US)

(73) Assignee: BYTEDANCE INC., Wilimington (DE)

( * ) Notice: Subject to any disclaimer, the term of this patent is extended or adjusted under 35 U.S.C. 154(b) by 0 days.

(21) Appl. No.: 18/304,799

(22) Filed: Apr. 21, 2023

(65) Prior Publication Data

US 2023/0351445 A1    Nov. 2, 2023

Related U.S. Application Data

(63) Continuation of application No. 16/710,415, filed on Dec. 11, 2019, now Pat. No. 11,669,864, which is a
(Continued)

(51) Int. Cl.
*G06Q 30/02* (2023.01)
*G06Q 30/0204* (2023.01)
(Continued)

(52) U.S. Cl.
CPC ......... *G06Q 30/0261* (2013.01); *G06Q 30/02* (2013.01); *G06Q 30/0205* (2013.01);
(Continued)

(58) Field of Classification Search
CPC ............... G06Q 30/0261; G06Q 30/02; G06Q 30/0205; H04L 67/306; H04L 67/52; H04W 4/024; H04W 4/02
See application file for complete search history.

(56) References Cited

U.S. PATENT DOCUMENTS

| 6,975,873 B1 | 12/2005 | Banks et al. |
| 7,206,568 B2 | 4/2007 | Sudit |

(Continued)

FOREIGN PATENT DOCUMENTS

| WO | WO-2008134595 A1 * | 11/2008 | ............. G06Q 30/02 |
| WO | WO-2009045262 A2 * | 4/2009 | ............. H04W 64/00 |

(Continued)

OTHER PUBLICATIONS

Clarke, R., "Person-Location and Person-Tracking: Technologies, Risks and Policy Implications," Dec. 13, 2000, retrieved on Apr. 27, 2008, from http://www.anu.edu.au/people/Roger.Clarke/DV/PLT.html, 24 pages.

(Continued)

*Primary Examiner* — Yonel Beaulieu
(74) *Attorney, Agent, or Firm* — Alston & Bird LLP

(57) ABSTRACT

Techniques are described for determining locations of interest based on user visits. In some situations, the techniques include obtaining information about actual locations of users at various times, and automatically analyzing the information to determine particular locations in a geographic area that are of interest, such as for frequent destinations visited by users. After determining a particular location of interest, it may be represented by generating a corresponding location model to describe the geographic subarea or other location point(s) covered by the determined location of interest, and one or more points of interest (e.g., businesses, parks, schools, landmarks, etc.) may be identified that are located at or otherwise correspond to the determined location of interest. In addition, a determined location of interest may be further used in various ways, including to identify later user visits to that location (e.g., to a point of interest identified for the location).

20 Claims, 16 Drawing Sheets

Related U.S. Application Data continuation of application No. 14/269,765, filed on May 5, 2014, now Pat. No. 10,546,323, which is a continuation of application No. 13/385,103, filed on Feb. 1, 2012, now Pat. No. 8,756,011, which is a continuation of application No. 12/150,565, filed on Apr. 28, 2008, now Pat. No. 8,135,505.

(60) Provisional application No. 60/914,556, filed on Apr. 27, 2007.

(51) Int. Cl.
| | |
|---|---|
| *G06Q 30/0251* | (2023.01) |
| *H04L 67/30* | (2022.01) |
| *H04L 67/306* | (2022.01) |
| *H04L 67/52* | (2022.01) |
| *H04W 4/02* | (2018.01) |
| *H04W 4/024* | (2018.01) |

(52) U.S. Cl.
CPC ............ *H04L 67/306* (2013.01); *H04L 67/52* (2022.05); *H04W 4/024* (2018.02)

(56) References Cited

U.S. PATENT DOCUMENTS

| | | | |
|---|---|---|---|
| 7,447,508 B1 | 11/2008 | Tendler | |
| 7,953,548 B2 | 5/2011 | Vengroff et al. | |
| 8,135,505 B2 | 3/2012 | Vengroff et al. | |
| 8,255,393 B1* | 8/2012 | Yu ........................ | H04W 4/029 707/724 |
| 8,311,845 B2 | 11/2012 | Vengroff et al. | |
| 8,370,340 B1* | 2/2013 | Yu ........................ | G06F 21/602 707/724 |
| 9,063,226 B2* | 6/2015 | Zheng ................... | G01S 19/40 |
| 10,861,255 B1* | 12/2020 | Karp ..................... | G07C 5/0841 |
| 11,669,864 B2* | 6/2023 | Vengroff ................ | H04L 67/52 705/14.58 |
| 2002/0111154 A1 | 8/2002 | Eldering et al. | |
| 2002/0156830 A1 | 10/2002 | Gayama | |
| 2002/0164995 A1 | 11/2002 | Brown et al. | |
| 2002/0183072 A1 | 12/2002 | Steinbach et al. | |
| 2004/0111184 A1 | 6/2004 | Chiappetta et al. | |
| 2005/0096840 A1* | 5/2005 | Simske ............ | G08G 1/096888 340/995.19 |
| 2006/0069749 A1 | 3/2006 | Herz et al. | |
| 2007/0262855 A1 | 11/2007 | Zuta et al. | |
| 2008/0021645 A1* | 1/2008 | Lau ....................... | H04W 4/025 701/469 |
| 2009/0005987 A1* | 1/2009 | Vengroff ................. | H04W 4/02 705/7.34 |
| 2009/0312946 A1 | 12/2009 | Yoshioka et al. | |
| 2011/0282964 A1 | 11/2011 | Krishnaswamy et al. | |
| 2013/0346170 A1* | 12/2013 | Epstein .............. | G06Q 30/0226 705/14.14 |
| 2019/0066036 A1* | 2/2019 | Roisen .................... | H04W 4/02 |

FOREIGN PATENT DOCUMENTS

| | | | | |
|---|---|---|---|---|
| WO | WO-2012096941 A2 * | 7/2012 | ........... | G06Q 20/387 |
| WO | WO-2021116739 A1 * | 6/2021 | ............. | H04L 67/18 |

OTHER PUBLICATIONS

Farwell, J., "Location is Everything," Aug. 2006, retrieved on Apr. 27, 2008, from http://www.pctoday.com/editorial/article.asp?article-articles%2F2006%2Ft0408%2F02108%2F02108.asp, 4 pages.

International Search Report and Written Opinion for ApplicationNo. PCT/US2008/061689 dated Sep. 16, 2008.

Kostov et al., Analysis of appropriate timing for information notification based on indoor user's location transitions, Jan. 2006, Fourth Annual IEEE International Conference on Pervasive Computing and Communications, pp. 472-475 (Year: 2006).

Roweis, S., Gaussian Identities, Jul. 1999, [online] [retrieved Mar. 23, 2016]. Retrived from the Internet: <URL: http://www.cs.nyu.edu/-roweis/notes.html>. 6 pages.

U.S. Appl. No. filed Apr. 13, 2007; In re: Vengroff et al., entitled "Location-Based Information Determination", U.S. Appl. No. 60/911,627.

Vincenty, T., Direction and Inverse Solutions of Geodesics on the Ellipsoid With Application of Nested Equations, Survey Review XXII (Apr. 1975) 88-93.

* cited by examiner

DETERMINING LOCATIONS OF INTEREST BASED ON USER VISITS

CROSS REFERENCE TO RELATED APPLICATIONS

This application is a continuation of U.S. patent application Ser. No. 16/710,415, filed Dec. 11, 2019 and entitled "Determining Locations Of Interest Based On User Visits" know U.S. Pat. No. 11,669,864), which is a continuation of U.S. patent application Ser. No. 14/269,765, filed May 5, 2014 and entitled "Determining Locations Of Interest Based On User Visits" (now U.S. Pat. No. 10,546,323, issued Jan. 28, 2020), which is a continuation of U.S. patent application Ser. No. 13/385,103, filed Feb. 1, 2012 and entitled "Determining Locations Of Interest Based On User Visits" (now U.S. Pat. No. 8,756,011, issued Jun. 17, 2014), which is a continuation of U.S. patent application Ser. No. 12/150,565, filed Apr. 28, 2008 and entitled "Determining Locations Of Interest Based On User Visits" (now U.S. Pat. No. 8,135,505, issued Mar. 13, 2012), which claims priority to and the benefit of provisional U.S. Patent Application No. 60/914,556, filed Apr. 27, 2007 and entitled "Identifying User Visits To Determined Locations of Interest," all of which are hereby incorporated by reference in their entireties.

TECHNICAL FIELD

The following disclosure relates generally to techniques for automatically determining locations of interest and for identifying user visits to such locations.

BACKGROUND

People are increasingly using computing devices to access information of a variety of types, including to access information over networks from remote devices and services (e.g., over the Internet and/or private networks, such as communications networks of cellular telephone service providers). One example of information that is often accessed and used includes various types of location-related information, such as maps. In addition, many users of computing devices may desire to search for or otherwise locate various types of information in a geographic area near the user, including based on a particular location of the user (e.g., to search for pizza restaurants within a specified distance of my current location)—in some circumstances, such activities may be referred to as "local search" or more generally as location-based information access. Users may use a variety of types of computing devices when accessing information, including both fixed-location computing devices (e.g., desktop computers) and mobile computing devices (e.g., laptop computers; handheld computers and/or communications devices, including cellular telephones with data communication capabilities; vehicle-based devices; etc.).

The availability of such location-based information provides a variety of benefits if the information is accurate, including the ability to provide the information to users who desire the information. However, various problems exist with current techniques for obtaining and providing such information. As one example, while some databases exist that have some location information for some types of businesses, it is typically difficult to obtain sufficiently accurate location information of a desired type for many points of interest. Furthermore, such location databases may not have any location information for a variety of types of points of interest.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
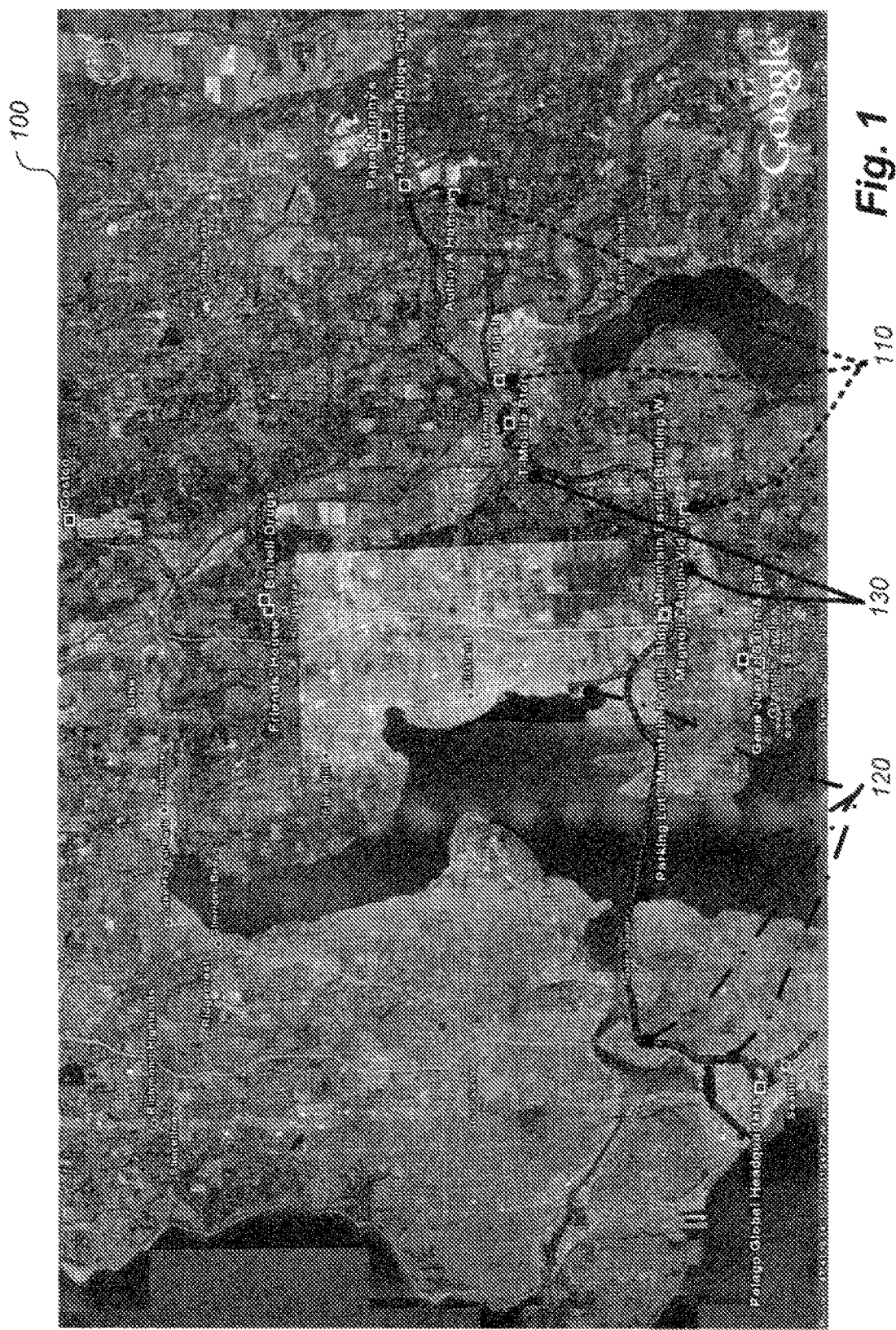
FIGS. 1 and 2 illustrate examples of using user travel information.

Techniques are described for determining locations of interest and for identifying user visits to such locations in various ways. In some embodiments, the techniques include obtaining information about actual locations of users at various times, such as based on communication devices or other computing devices of the users that include GPS or other location determination capabilities and that track the users' locations—depending on the type of user location information, travel paths and other movements of the users in one or more geographic areas may also be able to be determined. Such user location information may be analyzed to automatically determine particular locations within the geographic area(s) that are of interest (e.g., particular location points, groups of multiple proximate location points, other subareas of the geographic area, etc.), such as based on those determined locations being frequent destinations visited by users. After determining a particular location of interest, the techniques in some embodiments may include representing the location of interest by generating a corresponding location model to describe the subarea or other group of one or more points for the location of interest (e.g., to describe a boundary of the determined location of interest). Furthermore, if the determined location of interest is an anonymous location without a known identification (e.g., without an identification of one or more points of interest at that location), the techniques may in some embodiments include identifying one or more points of interest (e.g., businesses, parks, schools, landmarks, etc.) that are located at or otherwise correspond to the determined location of interest. In addition, a determined location of interest may be used in various ways, including to identify later user visits to that location. Additional details are included below related to determining locations of interest, generating location models to represent determined locations of interest, identifying actual points of interest at the determined locations, and using information about determined locations and identified points of interest to identify user visits (or for other purposes), referred to generally in aggregate herein as visitization techniques. In addition, in at least some embodiments, a visitization system automatically performs some or all of the described techniques, as described in greater detail below.

As previously noted, in at least some embodiments, the described techniques include automatically determining locations of interest (e.g., geographic subareas) that are visited by users or that are otherwise identified as being of interest, such as by analyzing location-related data for the users (e.g., location-related data obtained from GPS-enabled client devices of the users, such as AGPS-capable cellphones, that are configured to log or otherwise provide such data). In other embodiments, location-related data for users may be in other forms and/or obtained in other manners. For example, in at least some embodiments, some location-related data may be in a form other than GPS coordinates, such as locations based on street addresses, city blocks, a real estate parcel or lot, other governmentally assigned or designated location indications, relative to or otherwise based on a location of a device (e.g., a fixed location device) that detects or otherwise obtains information about a user who is sufficiently proximate, etc. In addition, in at least some embodiments, location information may be determined in a manner other than using the GPS system, such as based on other types of satellite positioning systems, by using dead reckoning or other inertial navigation systems, by using self reports from users of where they are currently located and/or have been previously located, such as may be provided directly to an embodiment of the visitization system and/or another application (e.g., a user's calendar system, a social networking service that tracks users' locations for use by other users of the social networking service, etc.), by using location-related data from fixed-location or other devices with which a user interacts or is detected as being nearby, etc. Devices with which a user interacts or is detected may have various forms in various embodiments, including the following non-exclusive list: RFID-based sensors (e.g., along roads for tolling purposes, in buildings to control entry, in passports or other types of identification to identify individuals, etc.); camera-based systems (e.g., that identify vehicle license plates, that use facial recognition, etc.); communications-based relays or other devices with which a sufficiently proximate client device of a user interacts (e.g., one or more cellphone towers or other cellular base stations via which a cellphone of the user communicates with other telephones, one or more Wi-Fi hotspot base stations via which a computing device of the user communicates over the Internet, etc.); point-of-sale transaction systems (e.g., based on using debit cards, credit cards, affinity cards, or other payment or tracking mechanisms with which user identity may be associated); etc.

As described in greater detail below, the analysis of user location information may include various activities in various embodiments, including the following: performing resolution, determination, and/or learning of locations for points of interest based on data from track logs or other stores of user location-related data; performing spatial-temporal clustering of location points of possible interest, such as by determining time and space changes that are sufficiently small that it is 'likely' that multiple location data sample points are within a single point of interest's location boundaries; and/or performing filtering to determine state information about a moving or otherwise moveable device that is providing location-related data, such as whether the device is in a vehicle or being carried by an ambulatory person (e.g., walking down a street, moving slowly in a building, temporarily stationary, etc.). Furthermore, in some embodiments, further analysis of types of user visits may be performed, such as to distinguish between types of visits or types of location (e.g., by time-of-day, day-of-week, duration of visit, etc.). In some embodiments, the analysis of user location information may include performing unsupervised learning of user location information, such as if there is insufficient current historical data for other types of analysis.

In addition, in at least some embodiments, the described techniques include automatically identifying user visits to locations of points of interest (e.g., for locations automatically determined and/or points of interest automatically identified using at least some of the visitization techniques), such as based on location-related data from a single GPS track log of a user's device or based on another indication of one or more locations of the user. As described in greater detail below, the identification of user visits may include various activities in various embodiments, including the following: identifying that a particular visit to a particular point of interest's location has occurred; comparing an identified visit to other visits to the same or other locations, such as to quantify the visit relative to 'typical' visits to the location and/or to categorize a type of the visit relative to one or more other parameters of interest (e.g., a duration; a purpose of the visit and/or activity performed, such as to visit a Starbucks to take out coffee versus to meet with a friend; etc.); and/or determining relationships between users and their activities (e.g., to identify that people who visit location A and/or perform activity B also visit location C and/or perform activity D; to identify that multiple users are acting together or otherwise engaged in a common activity at a point of interest, such as based on arrival and departure information and/or other information for the users; etc.), such as via data mining. Additional details related to automatically identifying locations of points of interest based on user visits and to automatically identifying user visits to locations of points of interest are included below.

FIGS. 13-16 illustrate operations of an example embodiment of a visitization system, with at least some of the illustrated operations being described in greater detail elsewhere. It will be appreciated that, in other embodiments, some of the types of illustrated operations may not be performed and/or additional types of operations may be performed.

Figure 13:
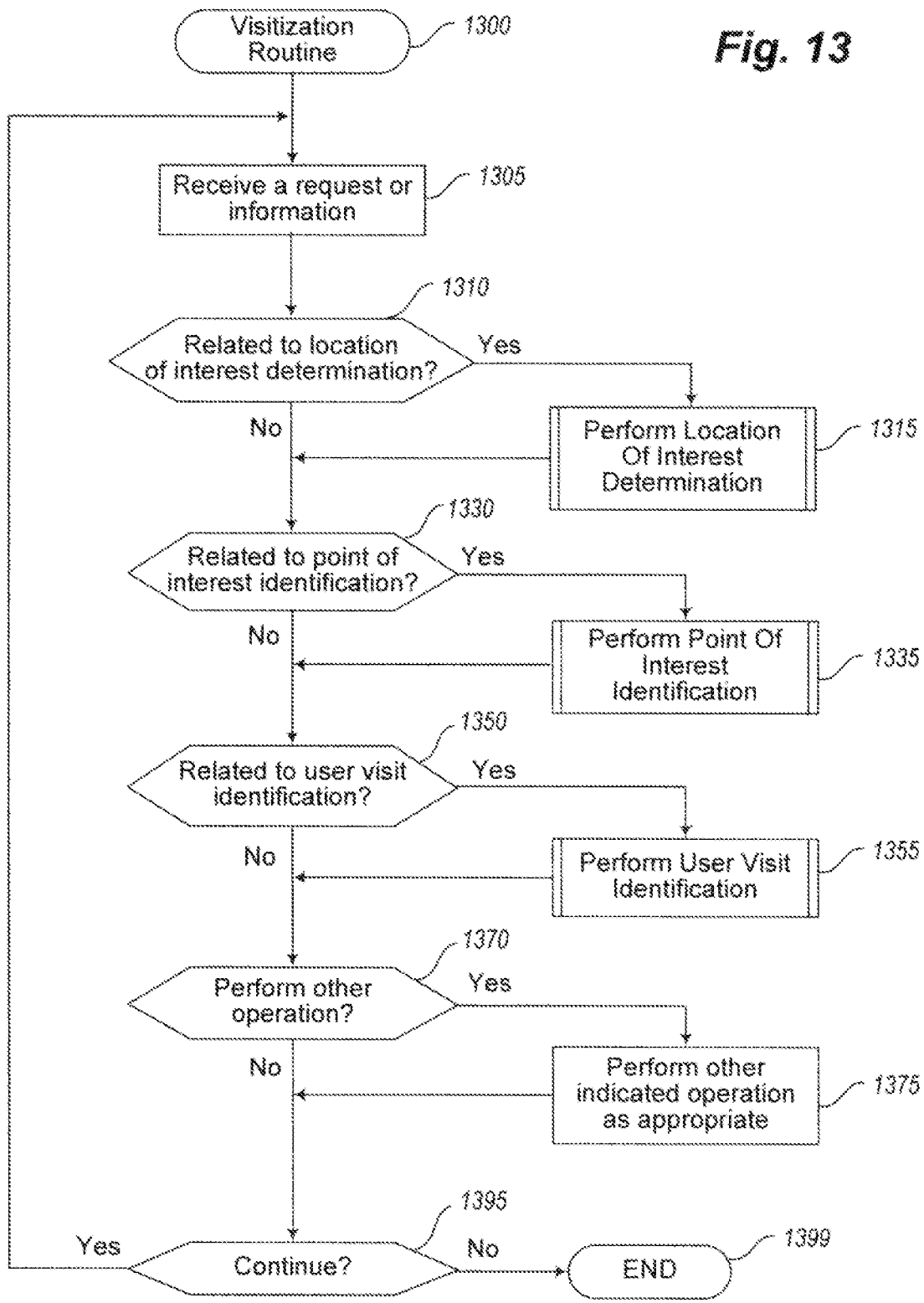
FIG. 13 is a flow diagram of an example embodiment of a Visitization routine.)

FIG. 13 is a flow diagram of an example embodiment of a Visitization routine 1300. The routine may be performed by, for example, execution of the Visitization system 1150 of FIG. 11 and/or the visitization system embodiment whose architecture and data flow 1000 are described with respect to FIG. 10, such as to perform at least some of the described visitization-related techniques. In this illustrated embodiment, after a location of interest is determined, the visitization system further determines one or more location models to represent the determined location of interest, such as Location Spatial Models ("LSMs") as discussed in greater detail elsewhere, although in other embodiments locations may be represented or tracked in other manners.

The illustrated embodiment of the routine begins at block 1305, where an indication of a request or other information is received. The routine then continues to block 1310 to determine whether the received indication is related to analyzing travel information or other location information for one or more users to determine one or more locations that are of interest based on being destinations visited by the user(s), such as for locations of interest that are each a subarea of a geographic area or other group of one or more associated location points. If so, the routine continues to block 1315 to execute a routine to perform such determination for locations of interest, with one example of such a location-related determination routine being described with respect to FIG. 14. The indication received in block 1305 may have various forms, including the following non-exclusive list: a request from an external system (e.g., via a defined API of an embodiment of the visitization system that allows such requests) for information about one or more such location models or other indications of locations of interest (e.g., for all locations that are determined to be of interest in a geographic area; for some such locations, such as of one or more types or that otherwise satisfy indicated criteria; for an indicated location of interest, such as to correspond to an indicated point of interest; etc.), optionally with supplied user location information to be analyzed; received user travel information or other user location information to be analyzed, such as information directly pushed from one or more users' devices or that is otherwise received from another provider of information for one or more users; an indication that is automatically generated by the routine 1300 to perform the location-related determination, such as based on an amount of time elapsing since a prior performance of the location-related determination or based on prior receipt of sufficient user location information to be analyzed (e.g., for a minimum number of users, a minimum amount of time, to cover a minimum geographic area, etc.); an instruction from a human operator representing the entity on whose behalf the visitization system is executed; etc.

After block 1315, or if it is instead determined in block 1310 that the received indication in block 1305 is not to perform a location-related determination, the routine continues instead to block 1330 to determine whether the received indication of block 1305 is related to identification of one or more points of interest that are associated with generated location models or with other indications of determined locations of interest (e.g., for location models that have just been generated with respect to block 1315, or instead other location models or location indications that are supplied or otherwise indicated). If so, the routine continues to block 1335 to execute a routine to identify one or more such points of interest, with one example of such a point of interest identification routine being illustrated with respect to FIG. 15. In a manner similar to that previously described with respect to block 1310, the indication in block 1305 that is related to identification of points of interest may have various forms, including the following non-exclusive list: a request from an external system (e.g., via a defined API of an embodiment of the visitization system that allows such requests) for information about one or more such points of interest (e.g., for points of interest that correspond to all locations that are determined to be of interest in a geographic area; that correspond to some such locations, such as of one or more types or that otherwise satisfy indicated criteria; that correspond to an indicated location of interest; etc.), optionally with supplied information about one or more location models or other indications of one or more determined locations of interest for which point of interest identification is desired; one or more received location models or other indications of one or more determined locations of interest for which the point of interest identification is performed; an indication that is automatically generated by the routine 1300 to perform the point of interest identification, such as based on an amount of time elapsing since a prior performance of the point of interest identification or based on prior determination of sufficient information to be analyzed about locations of interest (e.g., sufficient location models or other indications of determined locations of interest; sufficient information about possible points of interest, such as for a minimum number of possible points of interest or for points of interest that cover a minimum geographic area, etc.); an instruction from a human operator representing the entity on whose behalf the visitization system is executed; etc.

After block 1335, or if it is instead determined in block 1330 that the indication received in block 1305 is not related to identification of points of interest, the routine continues to block 1350 to determine whether the indication received in block 1305 is related to identifying one or more user visits to one or more previously identified points of interest that have an associated location model or other location-related information (e.g., for points of interest that have just been identified with respect to block 1335, or instead other points of interest whose associated information is supplied or otherwise indicated). If so, the routine continues to block 1355 to perform a routine to identify such user visits, with one example of such a user visit identification routine being described with respect to FIG. 16. In a manner similar to that previously described with respect to blocks 1310 and 1330, the indication in block 1305 that is related to user visit identification may have various forms, including the following non-exclusive list: a request from an external system (e.g., via a defined API of an embodiment of the visitization system that allows such requests) for information about one or more such user visits (e.g., to correspond to visits to all identified points of interest with associated location information in a geographic area or otherwise to all locations determined to be of interest in the geographic area; to correspond to some such points of interest or other locations of interest, such as of one or more types or that otherwise satisfy indicated criteria; to correspond to an indicated point of interest or other location of interest; etc.), optionally with supplied information about one or more points of interest or other locations of interest and/or with supplied user location information from which to identify user visits; received information about one or more points of interest or other locations of interest for which the user visit identification is performed; received user location information from which to identify any user visits to known points of interest or other locations of interest for which the user visit identification is performed; an indication that is automatically generated by the routine 1300 to perform the user visit identification, such as based on an amount of time elapsing since a prior performance of the user visit identification or based on prior determination of sufficient point of interest information or other location of interest information to be analyzed (e.g., sufficient information about possible points of interest or other determined locations of interest; sufficient information about user location information from which user visits are to be identified; etc.); an instruction from a human operator representing the entity on whose behalf the visitization system is executed; etc.

After block 1355, or if it is instead determined in block 1350 that the indication received in block 1305 is not related to identifying user visits, the routine continues instead to block 1370 to determine whether the indication received in block 1305 is to perform one or more other indicated operations. If so, the routine continues to block 1375 to perform one or more other such operations as appropriate, such as if the requester is authorized to request such operation performance. Other types of operations may include, for example, the following non-exclusive list: receiving and responding to requests for various types of determined or identified information; retrieving externally available information about geographic areas of interest and/or about user travel in those geographic areas, such as by periodically polling or otherwise retrieving information from client devices of particular users and/or from other information stores that contain such information; determining whether to initiate performance of one or more of the routines described with respect to blocks 1315, 1335, and 1355, such as based on having received sufficient information since a prior performance of the routine (if any), based on a predefined period of time expiring, etc.; to perform various types of housekeeping operations; etc. In addition, the indication to perform one or more such other operations may be from various sources in various embodiments, such as a human operator, the executing routine 1300 of the visitization system, another external system, etc.

After block 1375, or if it is instead determined in block 1370 that the indication received in block 1305 is not to perform one or more other operations, the routine next determines in block 1395 whether to continue, such as if the routine continues to operate until explicitly terminated. If so, the routine returns to block 1305, and if not continues to block 1399 and ends.

Figure 14:
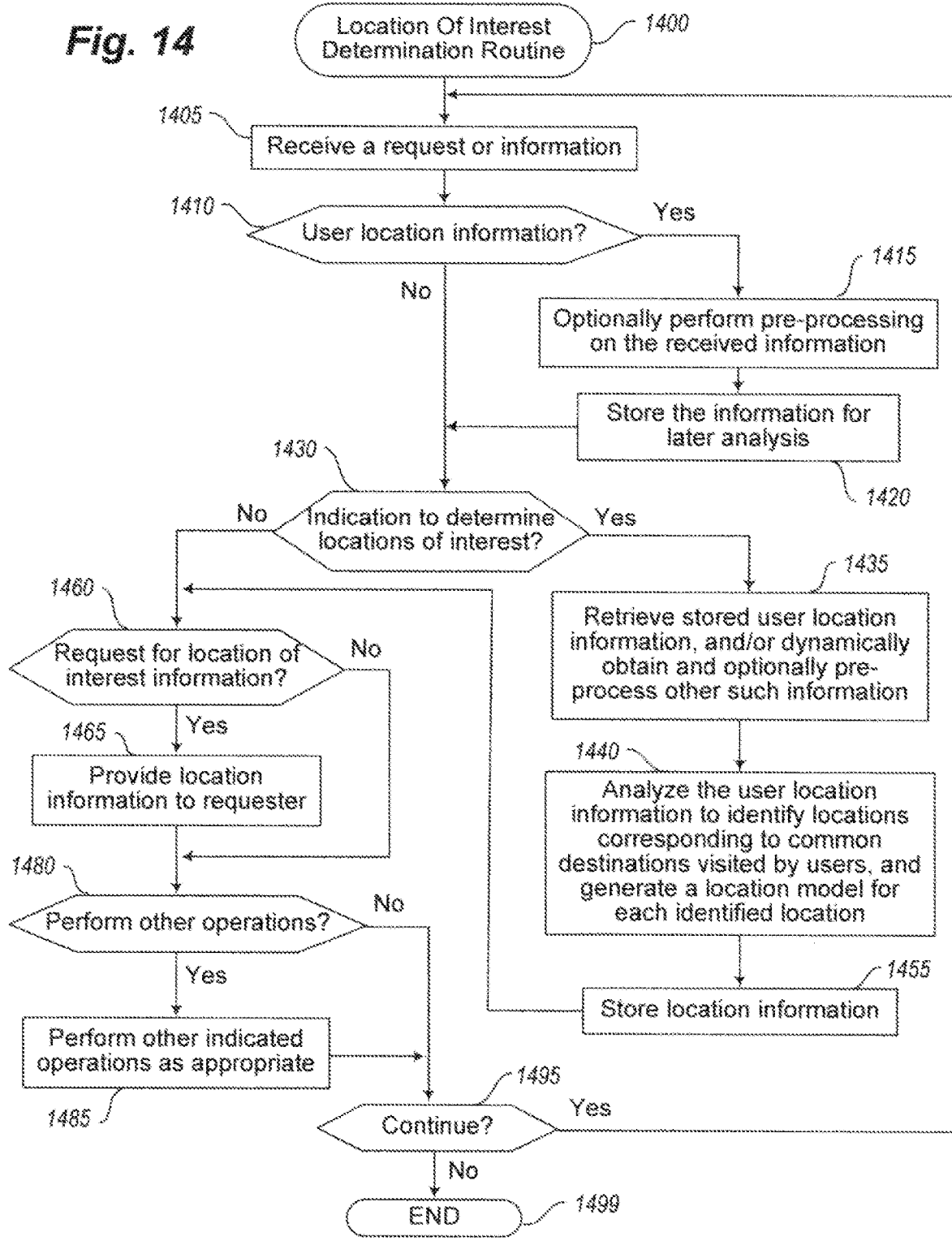
FIG. 14 is a flow diagram of an example embodiment of a Location Of Interest Determination routine.

FIG. 14 is a flow diagram of an example embodiment of a Location Of Interest Determination routine 1400. The routine may be performed by, for example, execution of the Location Of Interest Determiner component 1152 of FIG. 11 and/or the Anonymous Location Detector component of FIG. 10, such as to determine geographic subareas or other groups of one or more associated location points that are of interest (e.g., based on those locations being common, repeated, or otherwise frequent destinations of users in a geographic area). The routine may be invoked, for example, with respect to block 1315 of FIG. 13, or otherwise directly by other visitization system components or external systems. In the illustrated embodiment, the routine generates location models for locations that are determined to be of interest, which in some embodiments may be Location Spatial Models ("LSMs") as described in greater detail elsewhere, while in other embodiments other types of location models or no location models may be used.

The illustrated embodiment of the routine begins at block 1405, where an indication of a request or other information is received. The routine continues to block 1410 to determine whether the indication received in block 1405 is user location information that corresponds to one or more users' locations at one or more times, such as may be part of a travel path or other travel information for a user as the user moves around one or more geographic areas. If so, the routine continues to block 1415 to optionally perform pre-processing on the received information, such as to prepare the received information for later analysis to determine locations of interest. For example, in some embodiments, information about locations of users may be received in different formats and/or with different types of information included, and may be pre-processed to place the location information in a standard format. As one example, some user location information may be provided with latitude and longitude values (e.g., based on location information from a GPS receiver), while in other situations at least some location information may have other forms (e.g., a change or difference relative to another location, such as to reflect dead reckoning from another known location or to reflect another location that is of a fixed-location device that detects remote users; an indication of a location at or near a notable point of interest in a geographic area; location information corresponding to street layouts; etc.). In addition, in some situations, at least some location information values may lack some desired information, such as if location points are periodically reported that each include latitude and longitude as well as an associated timestamp, but velocity information corresponding to user travel is desired—if so, such additional information may be obtained in various ways, such as by obtaining approximate velocity information between two or more successive location points by using the time differential and location differential of those location points to estimate a speed. After block 1415, the routine continues to block 1420 to store the information for later analysis.

In addition, while not illustrated here, if the user location information is for one or more users who have client devices with data and/or voice communication capabilities, in some embodiments the routine may in at least some situations communicate with those client devices in an effort to obtain additional information of interest from the users. For example, as discussed in greater detail elsewhere, a user may be queried to provide information about the identification of a point of interest that a user has visited or is visiting and that corresponds to one or more user location points reported for that user, such as by providing the user with one or more candidate points of interest that may correspond to the reported location point(s) and requesting the user to provide a user self report that confirms at least one of those candidates as actually being visited by the user, or instead by allowing the user to provide information about a point of interest in another manner (e.g., via freeform input). Such querying of a user may be performed in such embodiments in various situations, such as for all users at all times, for a subset of users who are likely to provide reliable information (e.g., registered users), for users who are currently at a location about which the query is made, for users at locations for which a particular type of point of interest information is available (e.g., if no information has been obtained about possible points of interest at the location; if information has been obtained about possible candidate points of interest for the location but actual point(s) of interest for the location have not been identified; if information about actual point(s) of interest has already been obtained for the location, such as to confirm or supplement that already obtained information), etc.

After block 1420, or if it is instead determined in block 1410 that the indication received in block 1405 is not user location information, the routine continues instead to block 1430 to determine whether the indication received in block 1405 is to analyze user location information for one or more users to determine locations of interest, such as based on concurrently supplied user location information and/or on previously supplied user location information. The indication received in block 1405 may be, for example, a request from an embodiment of the visitization system (e.g., another component of the visitization system) or other requester to determine locations of interest for an indicated geographic area and/or to analyze an indicated group of user location information, or may instead be prompted in other manners (e.g., based on expiration of a time period since a prior determination, if any, of locations of interest; based on having received sufficient user location information to analyze; etc.). If it is determined in block 1430 that the received indication is to determine locations of interest, the routine continues to block 1435 to obtain the user location information to be analyzed, such as based on receiving the information in block 1405 (e.g., as part of a request to analyze that user location information), by retrieving stored user location information (e.g., information stored previously in block 1420), and/or by dynamically obtaining user location information from one or more users' client devices or from another source of such information. In addition, user location information that is obtained in a manner other than by retrieving stored information may further be optionally be pre-processed in a manner similar to that previously discussed with respect to block 1415.

In the illustrated embodiment, the routine then continues to block 1440 to analyze the user location information obtained in block 1435 in order to determine zero or more locations that are destinations of interest based on being visited by users in accordance with one or more indicated criteria (e.g., destinations that are determined to be frequently visited, such as based on being visited one or more of at least a minimum number of times, by a minimum number of distinct users, for a minimum duration, etc.). In addition, in the illustrated embodiment, the routine then generates one or more location models for each determined location of interest, although in other embodiments location-related information for determined locations may be represented in manners other than a location model. While not illustrated here, in some embodiments, at least a minimum amount of user location information may be used when performing an analysis to identify locations of interest and/or corresponding location models, and if so the routine may proceed to perform the analysis in block 1440 only if sufficient information is available. As described in greater detail elsewhere, a user visit to a particular location may be identified in various ways in various embodiments, and a destination location of interest may similarly be determined in various manners in various embodiments. For example, a user visit to a location may be considered to have occurred only if one or more indicated criteria are satisfied, such as if a user spends a sufficient duration of time at or near the location (e.g., a predefined minimum threshold amount of time, an amount of time that is statistically significant when compared to other activities of the user and/or of other users, an amount of time that is otherwise measured relative to other travel or activities of the user, etc.). Similarly, to be considered a destination location of interest for user visits, a particular location may need to satisfy one or more indicated criteria, such as to be visited by a predefined minimum threshold number of different users, to be visited as part of a predefined minimum threshold number of different user visits, to be visited for a predefined minimum threshold aggregate duration of time, to have a quantity and/or type of user visits that are statistically significant when compared to other activities of users and/or user visits at other possible locations of interest, etc.

In addition, various other types of information may be used in at least some embodiments to determine a location of interest and/or associated location model, such as by using a predefined minimum and/or maximum size for such a location or location model, using one or more predefined shapes for such a location or location model, etc. In at least some embodiments, a location model may specify any type of polygonal shape or other type of geometric shape (e.g., with one or more curves, including a circle or oval). In addition, in some embodiments, the analysis of the user location information may include identifying stable points of user travel and determining LSMs centered around groups of multiple user location points, as discussed in greater detail elsewhere. In yet other embodiments, a location model may not be explicitly generated for a determined location of interest, such as if a group of one or more associated location points is instead used to represent the location of interest, such that a visit to the determined location of interest occurs if a user's location matches one of the location points of the group or is instead within a predefined distance of one or more such location points. Additional details related to determining locations of interest and generating location models for such determined locations of interest in at least some embodiments are discussed in greater detail elsewhere. After block 1440, the routine continues to block 1455 to store the generated location models and other information about determined locations of interest for later use.

After block 1455, or if it is instead determined in block 1430 that the indication received in block 1405 is not to determine locations of interest, the routine continues instead to block 1460 to determine whether the indication in block 1405 includes a request for information about determined locations of interest (e.g., indications of one or more determined locations of interest, generated location model information for one or more such determined locations of interest, etc.), such as from another component of an embodiment of the visitization system or from another requester. If so, the routine continues to block 1465 to provide the requested location-related information (e.g., by retrieving information previously stored with respect to block 1455, by using information generated in response to the request received in block 1405, etc.) as appropriate, such as if the requester is authorized to receive that information. After block 1465, or if it is instead determined in block 1460 that the indication received in block 1405 is not a request for location-related information, the routine continues instead to block 1480 to determine whether to perform one or more other operations, such as in response to a received request or otherwise. If so, the routine continues to block 1485 to perform one or more other such operations as appropriate. For example, such other operations may include one or more of the following non-exclusive list: obtaining user location information from one or more users' client devices, such as on a periodic basis or as otherwise initiated; updating previously determined location models or other information about previously determined locations of interest, such as based on newly received user location information or as otherwise initiated; etc. In addition, the indication to perform, one or more such other operations may be from various sources in various embodiments, such as a human operator, a component of an embodiment of the visitization system, another system external to the visitization system, etc.

After block 1485, or if it is instead determined in block 1480 that the indication received in block 1405 is not to perform other operations, the routine next determines in block 1495 whether to continue, such as if the routine continues to operate until explicitly terminated. If so, the routine returns to block 1405, and if not continues to block 1499 and ends.

Figure 15:
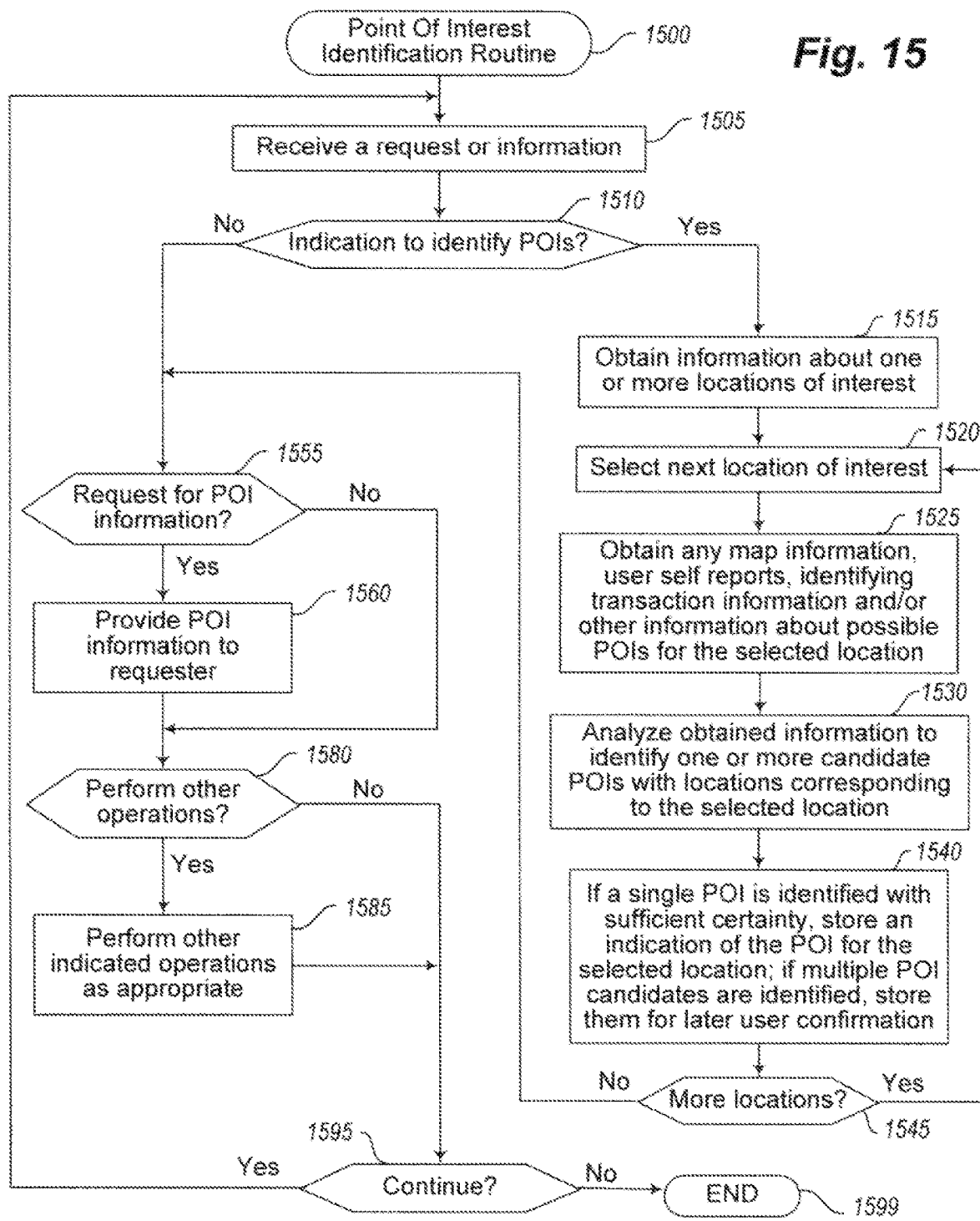
FIG. 15 is a flow diagram of an example embodiment of a Point Of Interest Identification routine.

FIG. 15 is a flow diagram of an example embodiment of a Point Of Interest Identification routine 1500. The routine may be provided by, for example, execution of a Point Of Interest Identifier component 1154 of FIG. 11 and/or the Location To POI Correlation component of FIG. 10, such as to identify businesses and other points of interest that correspond to determined locations of interest (e.g., anonymous determined locations of interest). The routine may be invoked, for example, with respect to block 1335 of FIG. 13, or otherwise directly by other visitization system components or external systems. Various types of points of interest may be considered in various embodiments, and the types of information corresponding to those points of interest and the manners of obtaining that information may vary based on those point of interest types.

The illustrated embodiment of the routine begins at block 1505, where an indication of a request or other information is received. The routine continues to block 1510 to determine whether the indication in block 1505 is to initiate identification of one or more points of interest for one or more determined locations of interest. If so, the routine continues to block 1515 to obtain information about one or more determined locations of interest, such as generated location models for the determined locations of interest. The information may be obtained in block 1515 in various manners, such as based on information received in block 1505, information retrieved from storage (e.g., as previously stored with respect to block 1455 of FIG. 14), and/or information that is dynamically obtained (e.g., based on making a call to the routine 1400 of FIG. 14 to request that such information be provided, such as from stored information that was previously generated or by dynamically generating that information).

The routine then continues to perform blocks 1520-1540 for each location of interest to attempt to identify one or more points of interest that correspond to each such location. In particular, the routine continues to block 1520 to select the next location of interest to analyze, beginning with the first. In block 1525, the routine then obtains any available information that corresponds to possible points of interest whose locations are within or otherwise correspond to the proximity of the selected location model, such as map information and other databases with information about locations of points of interest, information from user self reports about points of interest that were visited by the user(s) when at one or more location points, transaction information corresponding to one or more user transactions each engaged in by the user(s) at a point of interest during a time that corresponds to one or more location points and that includes identifying information related to the point of interest, and/or other types of information. As previously noted, the types of information that are used to identify points of interest may vary in various embodiments. In addition, while block 1525 is illustrated as being performed for each location of interest in FIG. 15, in other embodiments block 1525 may be performed for only some selected locations, such as only once for all locations within a geographic area.

After block 1525, the routine then continues to block 1530 to analyze the obtained information from block 1525 to attempt to identify one or more points of interest that correspond to the selected location, such as based on the location of a point of interest (e.g., based on the location of the point of interest being fully enclosed within a location model or other subarea indicated for the selected location, having any common point shared between the location of the point of interest and such a location model, having a minimum absolute size or area percentage that is commonly shared between the location of the point of interest and such a location model, being within a predefined distance of the center or any point of such a location model, etc.) and/or on other information about the point of interest (e.g., identifying information from a transaction, user self report, etc.). In at least some embodiments, the identification of a point of interest for a selected location may include determining sufficient information to allow the point of interest to be uniquely or otherwise distinctly identified within a geographic area or otherwise, such as a name, contact information, unique identifier, etc. Furthermore, in some embodiments multiple points of interest may be associated with a single determined location of interest (e.g., multiple points of interest that are co-located or otherwise sufficiently proximate), while in other embodiments locations may be determined so as to have at most a single associated point of interest (e.g., by reducing a large location model that encompasses multiple points of interest into multiple smaller location models that each correspond to a single point of interest).

After block 1530, the routine continues to block 1540 to store information about any points of interest identified for the selected location. In particular, in the illustrated embodiment, if a single point of interest is identified for the selected location (e.g., with a sufficient degree of certainty, such as based on at least one type of information that is considered to be sufficiently reliable (e.g., user self reports from at least a minimum number of users, one or more transactions with identifying information, etc.), multiple less reliable types of information (e.g., a user self report and map information about location of a point of interest), etc.), information about that point of interest may be stored as an identification for the selected location. In addition, if multiple possible candidate points of interest are identified that may correspond to the selected location, in some embodiments those multiple point of interest candidates may be stored for later use, such as to present those candidates to a user as options for a point of interest that a user has visited when at a reported location point that corresponds to the selected location. The routine then continues to block 1545 to determine if there are more locations of interest to analyze, and if so returns to block 1520. Otherwise, or if it was instead determined in block 1510 that the received indication is not to identify points of interest, the routine continues to block 1555.

In block 1555, the routine determines whether the indication received in block 1505 is a request for point of interest information, such as from a component of an embodiment of the visitization system and/or other requester. If so, the routine continues to block 1560 to provide the requested point of interest information to the requester (e.g., by retrieving information previously stored with respect to block 1540, by using information generated in response to the request received in block 1505, etc.) as appropriate, such as if the requester is authorized to receive that information. After block 1560, or if it is instead determined in block 1555 that the indication received in block 1505 is not a request for information about points of interest, the routine continues instead to block 1580 to determine whether the indication received in block 1505 is to perform one or more other operations. If so, the routine continues to block 1585 to perform one or more other such indicated operations as appropriate. For example, such other operations may include one or more of the following non-exclusive list: obtaining information about possible points of interest for later use, such as periodically; performing updates to previously identified points of interest for locations of interest, such as based on changes to information about the locations of interest and/or additional available information about possible points of interest; various housekeeping operations, etc. In addition, the indication to perform one or more such other operations may be from various sources in various embodiments, such as a human operator, a component of an embodiment of the visitization system, another system external to the visitization system, etc.

After block 1585, or if it is instead determined in block 1580 that the indication received in block 1505 is not to perform other operations, the routine next determines in block 1595 whether to continue, such as if the routine continues to operate until explicitly terminated. If so, the routine returns to block 1505, and if not continues to block 1599 and ends.

Figure 16:
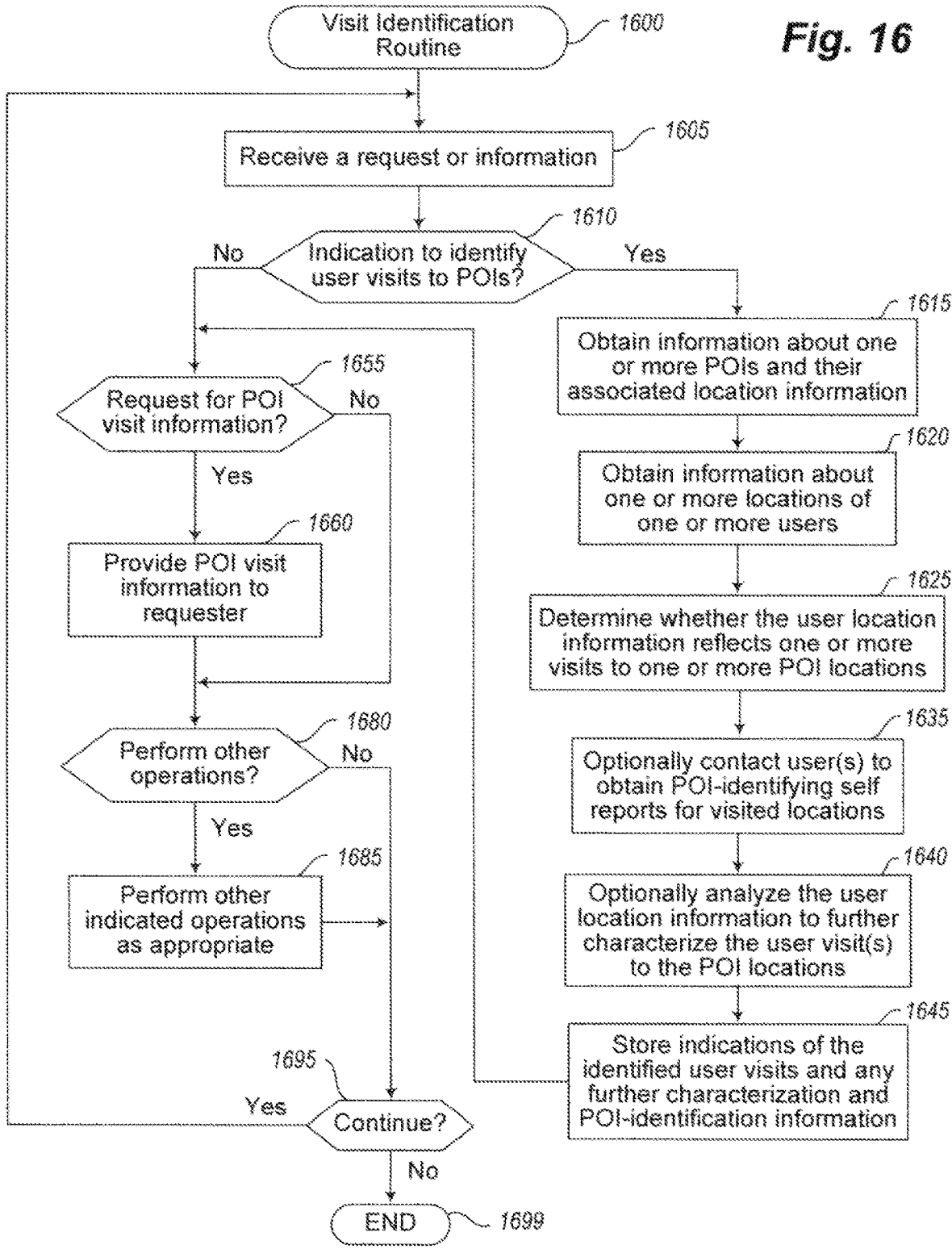
FIG. 16 is a flow diagram of an example embodiment of a Visit Identification routine.

FIG. 16 is a flow diagram of an example embodiment of a Visit Identification routine 1600. The routine may be performed by, for example, execution of a Visit Identifier component 1165 of FIG. 11 and/or the Visit Detection component of FIG. 10, such as to identify user visits to points of interest (e.g., based on automatically determined location information for those points of interest). The routine may be invoked, for example, with respect to block 1355 of FIG. 13, or otherwise directly by other visitization system components or external systems. In other embodiments, user visits to determined locations of interest may be identified, such as based on generated location models for those determined locations of interest, but without particular points of interest having been identified as corresponding to those determined locations of interest.

The illustrated embodiment of the routine begins at block 1605, where an indication of a request or other information is received. The routine continues to block 1610 to determine whether the indication received in block 1605 is to initiate identification of user visits to one or more points of interest. If so, the routine continues to block 1615 to obtain information about one or more points of interest to be considered, including associated location models or other location information for those points of interest. The information about the points of interest may be identified and obtained in various ways, such as based on being received in block 1605, retrieved from storage (e.g., to reflect point of interest information previously stored with respect to block 1540 of FIG. 15), dynamically retrieved (e.g., by making a request to routine 1500 of FIG. 15 for the point of interest information, such as based on stored point of interest information that was previously generated or point of interest information that is dynamically generated in response to the request), etc. In addition, one or more points of interest may be indicated in various ways, such as all points of interest that have been identified for a geographic area to which user visit location information of interest corresponds, points of interest of one or more indicated types or that otherwise satisfy indicated criteria, a particular indicated point of interest, etc.

The routine next continues to block 1620 to obtain information about one or more locations of one or more users to be analyzed to determine if, the user location information corresponds to any user visits to any of the points of interest. In a manner similar to block 1615, the information about the user locations may be obtained in various manners, such as by being received in block 1605, being retrieved from storage, being dynamically retrieved from one or more users' client devices or another data source with such information, etc. In addition, the user location information may correspond to one or more users at one or more times in various situations. After block 1620, the routine continues to block 1625 to determine whether the obtained user location information indicates the occurrence of one or more user visits to one or more identified points of interest, such as by matching location models or other location information of the points of interest. As discussed in greater detail elsewhere, a user visit to a location may be identified in various ways, such as any time that a location of a user passes within a location model and/or a predefined distance of a location model, when a user spends at least a minimum duration of time within or near such a location model, when the user location data reflects a user visit with at least a minimum degree of certainty, etc.

After block 1625, the routine continues to block 1635 to, in at least some embodiments, optionally contact one or more of the users whose user location information is being analyzed in order to attempt to obtain a user self report of an identification of one or more points of interest corresponding to one or more locations visited by the user, such as by using candidate point of interest identification information as previously discussed with respect to block 1540 and/or by asking the user to provide a freeform identification of such points of interest. As discussed in greater detail elsewhere, a point of interest may be identified in various manners, such as based on a name of the point of interest or any other unique identifier for the point of interest. After block 1635, the routine continues to block 1640 to optionally analyze the user location information to further characterize the one or more identified user visits to the one or more points of interest. As discussed in greater detail elsewhere, such characterization may include identifying one or more attributes of a user visit (e.g., duration), assessing a likely activity of the user during the user visit, determining relationships between that user and other users based on common activities or other indications, etc. In other embodiments, the actions of one or more of blocks 1635 and 1640 may not be performed. After block 1640, the routine continues to block 1645 to store indications of the determined user visits, as well as any point of interest identification information obtained with respect to block 1635 and any further characterization information identified with respect to block 1640.

After block 1645, or if it is instead determined in block 1610 that the indication received in block 1605 is not to identify user visits to points of interest, the routine continues instead to block 1655 to determine whether the indication received in block 1605 is a request for information about user visits to one or more points of interest, such as from another component of an embodiment of the visitization system or from another requester. If so, the routine continues to block 1660 to provide the requested point of interest user visit information to the requester (e.g., by retrieving information previously stored with respect to block 1645, by using information generated in response to the request received in block 1605, etc.) as appropriate, such as if the requester is authorized for such information. After block 1660, or if it is instead determined in block 1655 that the indication received in block 1605 is not a request for point of interest user visit information, the routine continues instead to block 1680 to determine whether the indication received in block 1605 is to perform one or more other operations. If so, the routine continues to block 1685 to perform one or more other indicated operations as appropriate. For example, the other operations may include one or more of the following non-exclusive list: obtaining information about user travel or other user locations for later use in identifying user visits for that information, such as periodically or as otherwise initiated; updating previously determined user visit identification information, such as to correspond to updates to identified points of interest and/or associated location models; performing other housekeeping operations; etc. In addition, the indication to perform one or more such other operations may be from various sources in various embodiments, such as a human operator, a component of an embodiment of the visitization system, another system external to the visitization system, etc.

After block 1685, or if it is instead determined in 1680 that the indication received in block 1605 is not to perform other operations, the routine next determines in block 1695 whether to continue, such as if the routine continues to operate until explicitly terminated. If so, the routine returns to block 1605, and if not continues to block 1699 and ends.

For illustrative purposes, some embodiments are described below in which particular types of location-based information for particular geographic areas is analyzed and used in particular ways, including to generate particular types of location models. These examples are provided for illustrative purposes and are simplified for the sake of brevity, and the inventive techniques can be used in a wide variety of other situations, some of which are discussed below. For example, while some of the included description focuses primarily on locations in a two-dimensional surface-bound plane, it will be appreciated that the same techniques apply equally to the use of three-dimensional position data and location models, such as discussed below with respect to, for example, FIG. 12.

Various details follow regarding specific examples of analyzing location-related data to automatically determine locations of points of interest and to identify user visits to such locations. For purposes of the following discussion, consider location-related data that includes multiple sources of GPS traces from a set of n users, $U_0, \ldots, U_n$, which describes a set of $k_i$ travel paths $P_{i,0} = P_{i,k_i}$ that are followed at various times and on various days and that originate in and cover various locations. Each path $P_{ij}$ may include a string of GPS data points, with each data point having values for latitude, longitude and a timestamp, and optionally having values for other parameters such as an altitude or 'z-value', velocity and error measure information, represented abstractly in this example as follows: $P_{i,j}=(x,y,[z],t,[v],[\sigma_x, \sigma_y, \sigma_z])$.

While the data points in this example are based on GPS data, in other embodiments other types of location-based information may instead be used, such as from other types of sources than GPS and/or with other forms. For example, other types of data that may be used as part of the analysis in at least some embodiments includes the following: one or more databases with location-related information such as addresses and/or other location information (e.g., address geocodes, street segments, etc.) for at least some possible points of interest ("POIs"), such as from commercial sources and to correspond to businesses and other organizations or entities; self-reported visit information based on reports from the users $U_i$ of visits they have made $SV_{i,0}, \ldots, SV_{i,n}$, such as to include information (whether approximate or exact) of a particular location and/or an identification of a point of interest (e.g., a name of a retail location) for a visit, such as approximate timing t and duration d of the visit, represented abstractly in this example as follows: $SV_{i,j}=(POI_{ID},[t,d])$; etc.

The use of the described visitization-related techniques may in at least some embodiments generate one or more of the following types of output data from the above-described input data types: a database of at least approximate locations that Users commonly visit, $L_v$; a database of POIs that Users visit, such as based on the combination of the user paths, POIs in the map dataset and self-reported visits; a determination of 'types of visit', s, that can be applied to each location (e.g., 'pass-by', 'drop-in', 'dwell', etc.); and/or a stream of observed User visits to POIs/locations, optionally with a corresponding confidence measure p for the observation. Such output data may be represented abstractly in this example as follows: $V_{i,j}=(L_v, POI_{ID}, t_{arrive}, t_{depart}, s, p)$.

Non-exclusive examples of types of devices and technology that may be used to obtain location-related data include the following: collecting GPS traces using non-assisted GPS technology via a GlobalSat Bluetooth GPS module transmitting raw GPS data to an iMate Smartflip Windows Mobile 5 Smartphone for logging; and using Assisted GPS (or "AGPS") technology on the Sprint cellular network via a Samsung A940 phone. User travel paths may include in-vehicle commutes and on-foot errands, including in urban and suburban environments.

Identifying User Visits and Visited POIs

Example embodiments of identifying user visits to locations of POs of interest and of identifying such POIs follow. In at least some such embodiments, user visits represent presence at a location, and identification is focused on measures of location invariance to within some spatial radius over a period of time. In this example, the location-related data for the user paths include only latitude/longitude and time information, represented as $P_{i,j}=(x,y,t)$. Of the remaining point properties of interest; [v] may be inferred using location and time-separation of known consecutive points, $$\vec{v_t} = \left[\frac{(x_t - x_{t-1})}{\Delta t}, \frac{(y_t - y_{t-1})}{\Delta t}\right],$$

while the error in the path point information $[\sigma_x, \sigma_y, \sigma_z]$ may be left as implicit to enable separate learning of a noise model for the locations of anonymous locations of interest (i.e., determined locations for which the particular corresponding point of interest has not yet been identified). The path-over-ground distance $d_{tm}=\|\overline{x_m}-\overline{x_t}\|$ and heading for any pair of points in a path may be computed in this example embodiment using the Vincenty equation with WGS84 parameters (for additional details, see Vincenty, T, *Direction and Inverse Solutions of Geodesics on the Ellipsoid with Application of Nested Equations* (April 1975) Survey Review XXII, pp. 88-93). Using this distance measure, for each point $x_t, y_t, t_t$ in a path, it is possible to compute an 'n-minute radius', $r_t^{(n)|}$, defined as the maximum distance in any direction that the path deviated from a selected point $[x_t, y_t]$ within the n minutes after a selected time $t_t$, represented as follows:

$$r_t^{(n)} = \max_m d_{tm}, \text{ s.t. } (t_m - t_t) \in [0, n].$$

Furthermore, in at least some embodiments, a partial n-minute radius may be defined so as to include only some data points that would otherwise be included within the radius, such as a specified percentage of data points that are closest to the selected point within the n minutes after the selected time (e.g., to identify the maximum distance in any direction that a path deviated from the selected point, corresponding only the closest 90% of the data points). In some situations, such a partial n-minute radius may provide various benefits, such as if there is significant noise or other variability in the data points for a path. In other embodiments, distances and travel times may be computed in other manners, including using techniques described in U.S. Provisional Application No. 60/911,627, filed Apr. 13, 2007 and entitled "Location-Based Information Determination," and in U.S. application Ser. No. 12/082,836, filed Apr. 14, 2008 and entitled "Location-Based Information Determination," each of which is hereby incorporated by reference in its entirety.

'Visits' made on the paths may then be analyzed by observing the effect of different threshold radii over different lengths of time. FIG. 1 shows a set of recent user travel paths in the Seattle area as part of a map image 100, with red dots 120 indicating individual GPS path location data sample points that are part of the one or more user travel paths (with only a few example data points labeled 120 in FIG. 1 for illustrative purposes). In addition, white squares 110 are illustrated to reflect n-minute radius locations (in this example, 2-minute radius locations for which $r_t^{(2mins)} \leq 10$ meters) based on the location data sample points (with only a few example white squares labeled 110 in FIG. 1 for illustrative purposes), together with user-provided self report textual labels 130 as to the visited location (with only a few example textual labels labeled 130 in FIG. 1 for illustrative purposes).

Figure 2:
Figure 12:
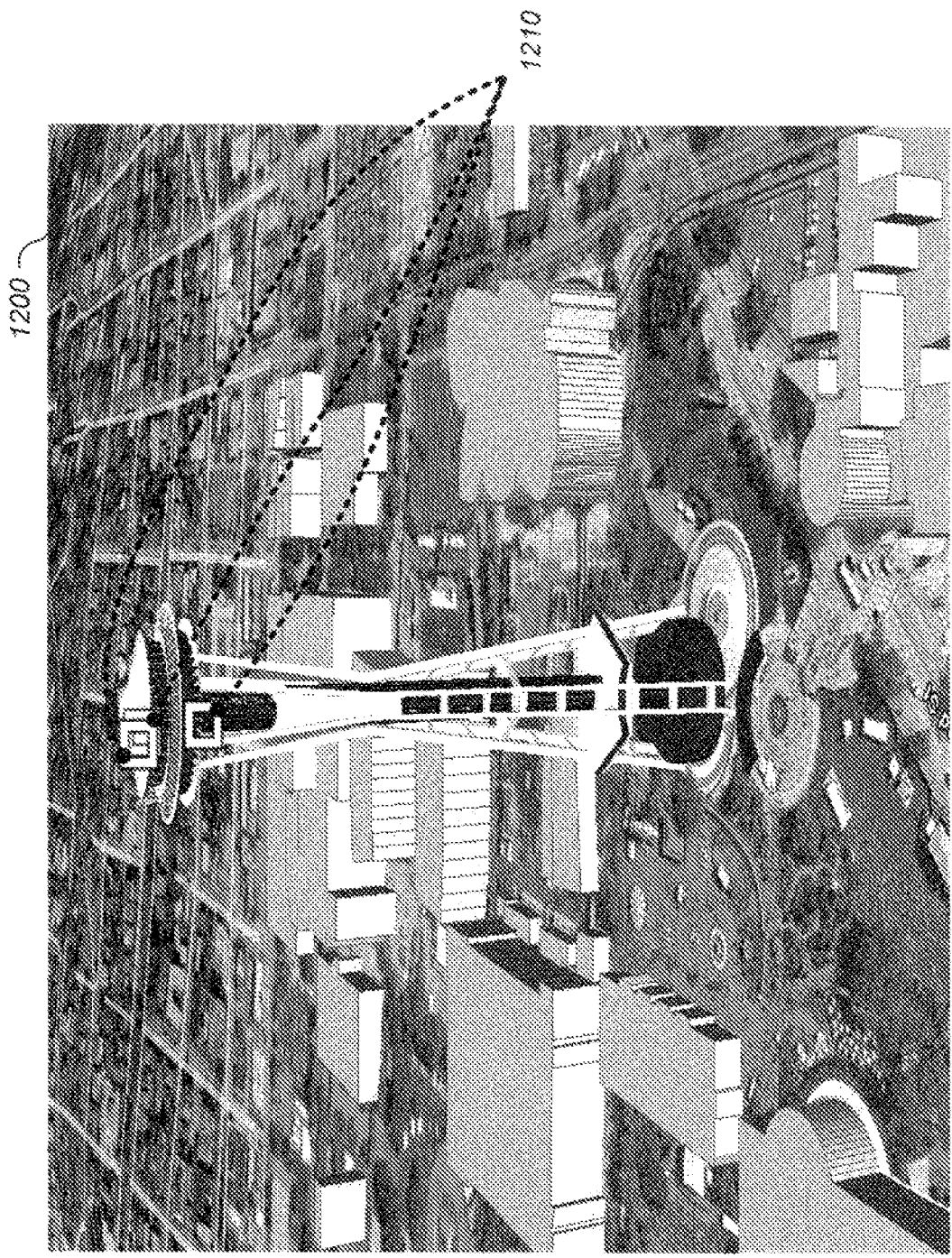

Furthermore, between visits, information about the context of parts of a user travel path may be enhanced by tracking speed $\|v^-\|$ in addition to position. In FIG. 2, path location data points are highlighted and colored by speed, using green>40 mph, yellow>15 mph, red>5 mph, 5 mph≥black≥0 mph in a map image 200 similar to map image 100 of FIG. 1. For example, for illustrative purposes, some "fast" green location data points are illustrated with labels 210 in FIG. 2, and some "intermediate" yellow location data points are illustrated with labels 220 in FIG. 2. This allows distinctions between driving in slow traffic, walking, and actually visiting a location to be viewed. It should be noted that a threshold value of the 'n-minute radius' of a point imposes an implicit criterion on the average speed of the user during the n-minute period. While FIGS. 1 and 2 illustrate location-related data from a 2-D perspective, such location-related data may in some embodiments instead reflect 3-D data (or data that indicates other types of supplemental data beyond 2-D location data). For example, FIG. 12 illustrates highlighted white squares 1210 to indicate example n-minute radius locations for GPS path data sample points (not shown) that reflect locations at the observation platform near the top of the Space Needle in Seattle, approximately 500 feet above ground level, as shown in a 3-D map image 1200. In this manner, LSMs (not shown) may be created for different elevated portions of a location of interest such as the Space Needle, such as to reflect a first POI (point of interest) corresponding to the ground floor gift shop, a second POI corresponding to mid-structure meeting rooms, a third POI corresponding to the observation platform near the top (which may have an associated location model based on one or more of the illustrated n-minute radius locations 1210), etc.

To facilitate analysis of location-related data, in some embodiments, a user visit to a location $VL_t$: may be described using a set of one or more consecutive "Stable Points" from that user at that location. Such a Stable Point at a Location $L_v$ may be described, for example, by the set of path points within a specified threshold n-minute radius R, represented as follows: $SP_l = \{\vec{x}_k\} s, t, d_{kl} \leq R$.

Location Spatial Models

In at least some embodiments, the automatic determining of locations of interest includes generating LSMs, while in other embodiments other types of location models may be used, or instead no location models may be used. The use of such LSMs provides various benefits, including accommodating uncertainty in measurements of locations. For example, multiple actual visits to the same locations may, due to device variation, GPS fix quality and variability, behavioral factors (e.g., parts of a store visited), etc., result in a spread of location points within the general vicinity of the interior of the location. If it is not possible to obtain the point-precision/error estimate of each path point from the location (GPS or other) equipment, the uncertainty in location of a POI may be modeled, such as based upon the statistical variation about centroids, of observed Stable Points at the location, as detected by the criteria described above. This allows the estimation of a generally polygonal 'shape' for the POI.

In some embodiments, the 'shape' of each Stable Point $SP_l$ is modeled with a Gaussian distribution as $s_l = N(\overline{\mu}_l, \Sigma_l)$, with $\overline{\mu}_l$ given by the centroid of all points within the radius criterion defining the visit, and $\Sigma_l$ describing the spatial covariance of the data points with respect to the centroid, represented as follows.

$$\vec{\mu}_l = \frac{1}{|k|} \sum_{k \, s.t. \, d_{kl} \leq R} \vec{x}_k \quad \Sigma_l = \frac{1}{|k|} \sum_{k \, s.t. \, d_{kl} \leq R} (x_k - \mu_l)(x_k - \mu_l)^T$$

To determine the shape of a given location, each of the Gaussians corresponding to the radius-neighbors of each individual Stable Point is summed in at least some embodiments, resulting in a noisy model for the shape of the location, as observed by multiple user paths, and provides a location noise model that may be used in combination with individual user paths to enable detection of location visits. Furthermore, an individual user-path within a location-shape may be used as an attribute for classifying the type of visit the user is making to the location. This observed model of the location is one example of an LSM for the location.

Figure 3:
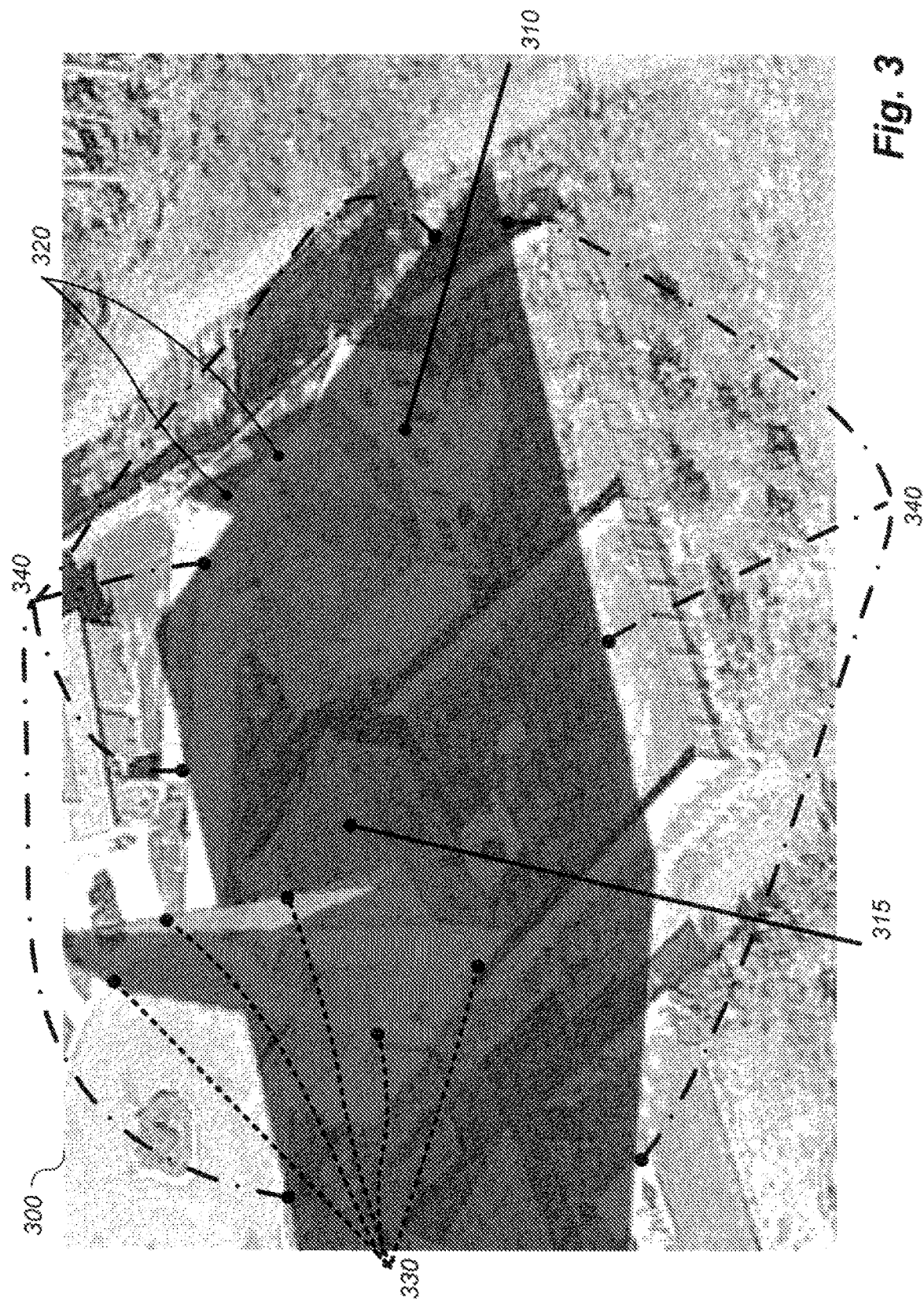
FIGS. 3-9 and 12 illustrate examples of visual representations of location models for points of interest and of analysis of user travel information to determine such location models.
Figure 4:
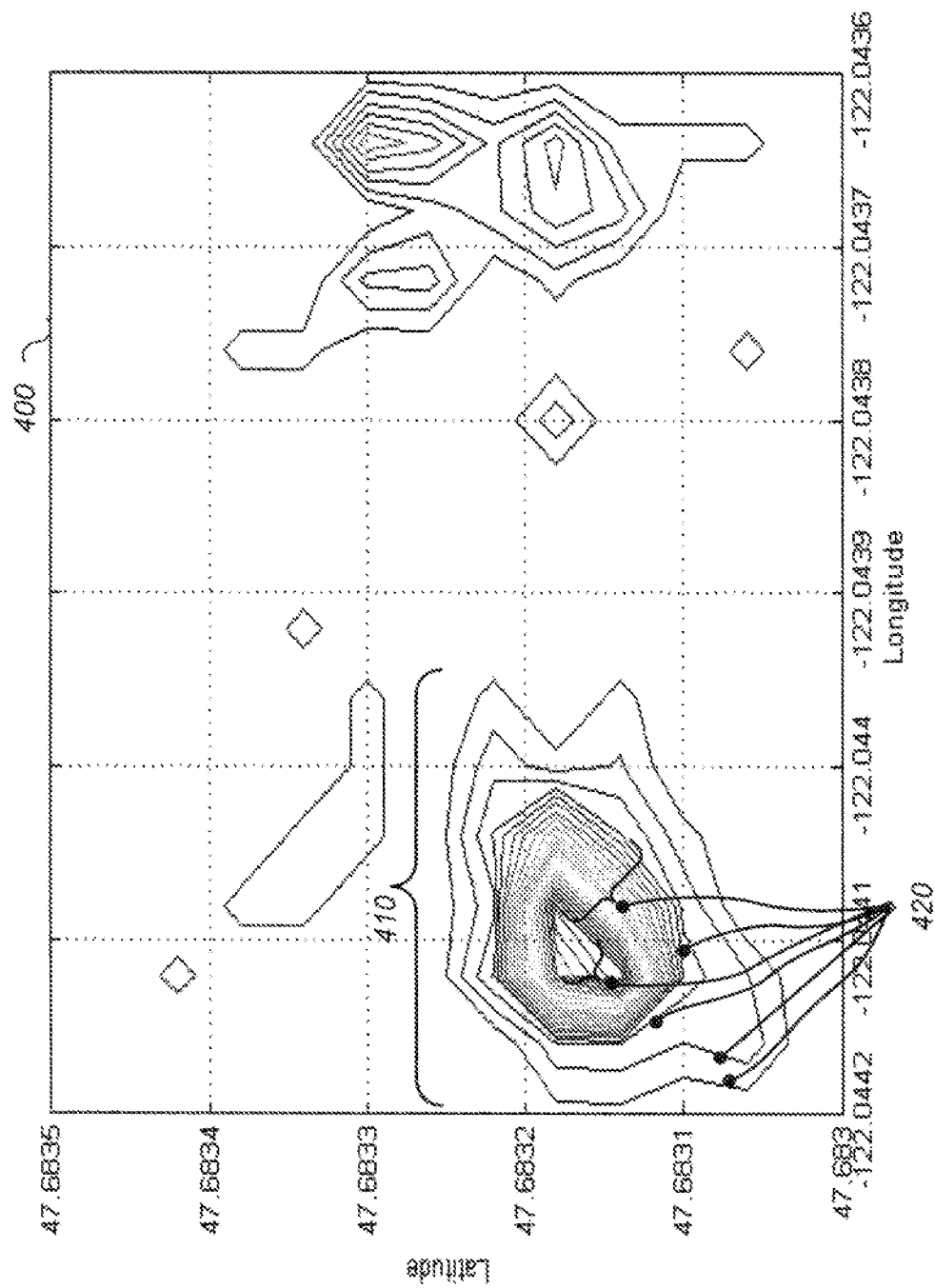

FIG. 3 reflects example location-related data from multiple user visits to a house 310 and adjacent building 315, such as may be derived from user location data such as the user paths illustrated in FIG. 1 and FIG. 2. In particular, FIG. 3 shows a surface plot of probability density of a resulting LSM, shown with edges 340, and with a large spike of high probability density shown with edges 330 reflecting a likely location model for the adjacent building 315, and a smaller spike 320 of high probability density reflecting a likely location model for the house 310. In particular, in this example, the example house and adjacent building may be treated as a single POI, with the LSM for that POI being shown overlaid on an image 300 of the physical layout of the house and adjacent building, as well as other neighboring buildings that are not part of the POI. FIG. 4 illustrates a similar contour plot 400 that may be used to display one or more LSMs or other location models, such as for the LSM and the POI described with respect to FIG. 3, as reflected in the group 410 of contour lines in which the various contour lines 420 reflect probability density information.

Learning Separate Models of Neighboring Locations

In at least some embodiments, various techniques may be used to determine separate LSMs for neighboring or otherwise related POIs, such as illustrated with respect to FIG. 3. For example, in many cases, even when neighboring physical locations do not overlap, their GPS signatures may. Nonetheless, it is possible to detect that multiple locations (or signatures of locations) are present. One example embodiment of such detection is based in part on an assumption that the centroids of the GPS signatures of each location are distinct, and therefore that the data points for each location naturally cluster.

One option for addressing this problem, that includes retaining the sum-of-Gaussians model of the LSMs as described above, involves learning a mixture of Gaussians using a clustering approach (e.g., k-means or Expectation-Maximization) across the area to detect the most likely number of clusters. This approach involves learning a model over a generally non-local spatial extent to detect the presence of many 'GPS-overlapping' locations.

Figure 5:
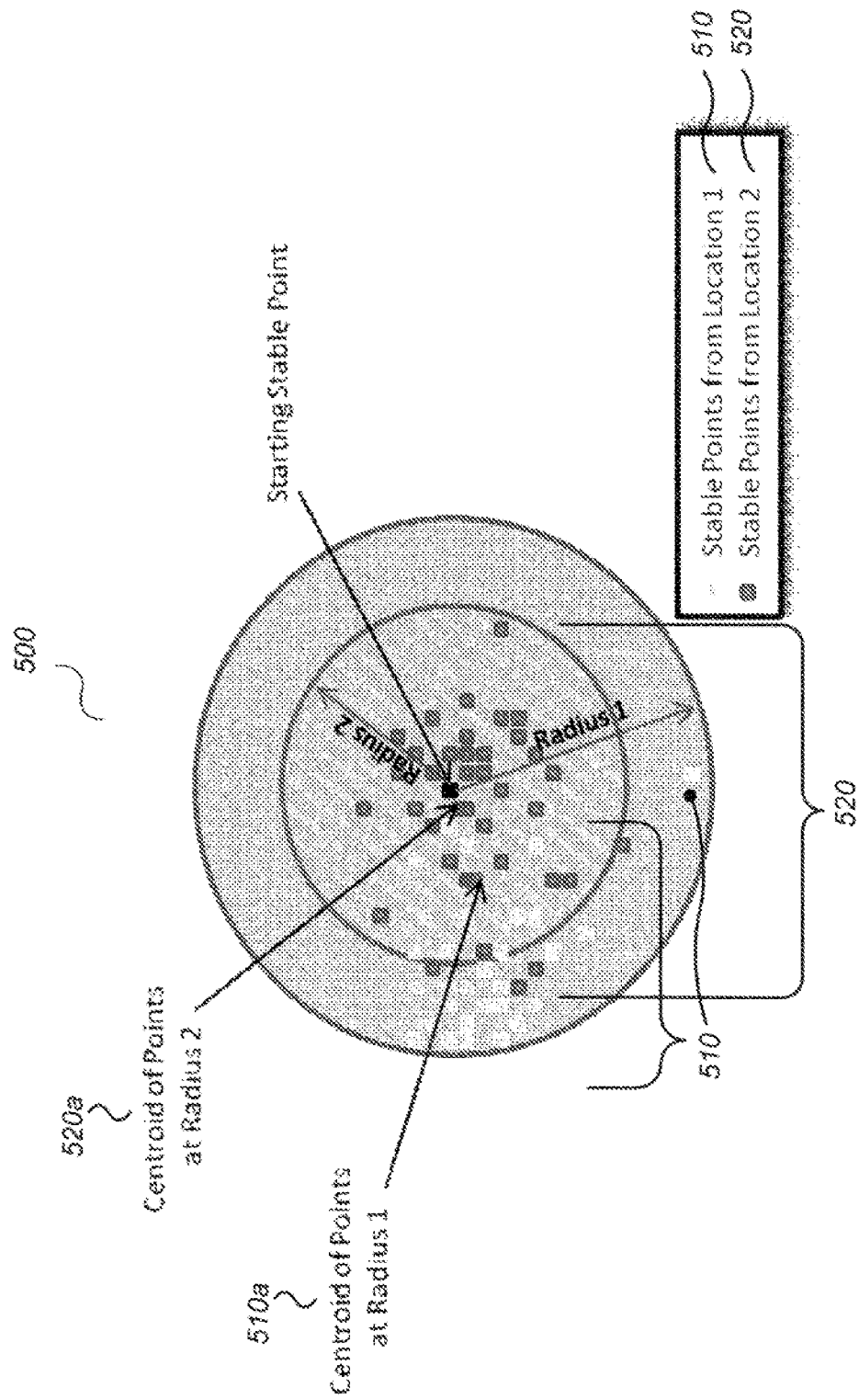

One alternative option for addressing this problem is to employ a local heuristic for detecting likely-distinct clusters of stable points, based on the assumption that the centroids of the GPS signatures of each location are distinct. In such a case the detection may in some embodiments be performed as follows:
1. Determine all stable points in a geographic area (neighborhood, city, county, state, region)
2. Loop over all stable points not yet assigned to an LSM:
   Loop over decreasing search radius L, until centroid moves by O(qL) from the preceding value of L to the next
      Using first stable point as an anchor, search in radius of L meters for nearby stable points
      Compute the centroid of all stable points within the search radius
      Use all stable points within the final search radius to learn the LSM for the location This produces a set of LSMs learned from clusters of stable points focused on a common center of mass, rather than multiple separated centers of mass. In the case of a high density of neighboring locations in a row, it may be beneficial to recursively apply this approach, since, for example, a row of 4 locations could easily be divided first by this algorithm into a row of 2 pairs of locations. FIG. 5 illustrates an example 500 of a portion of this technique for data samples from two nearby locations of interest (not shown), with two separate centroids 510a and 520a identified for overlapping groups of stable points 510 and 520, respectively.

Figure 6:
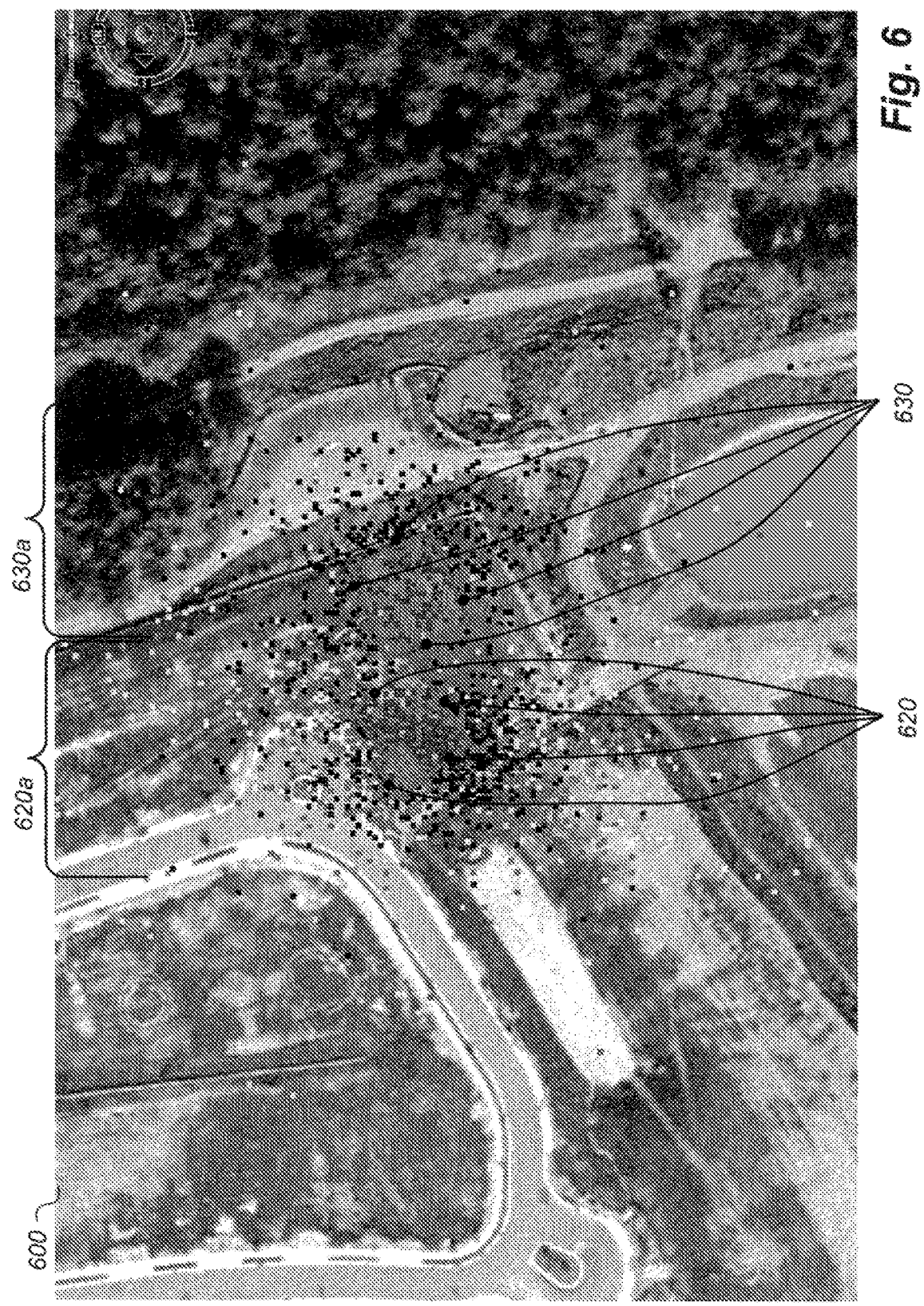
Figure 7:
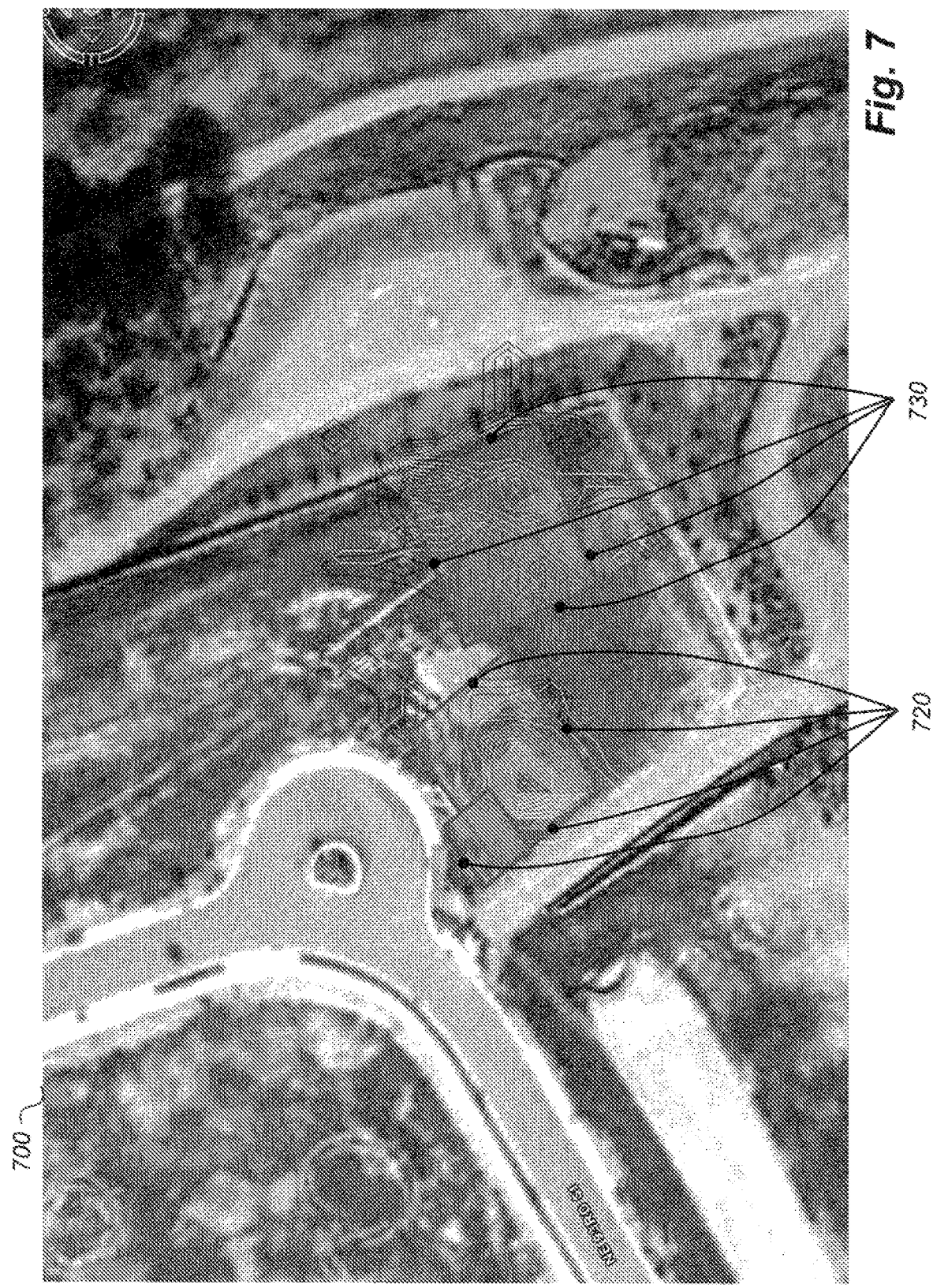

An example for two neighboring homes in a residential neighborhood, such as in a manner similar to the example of FIG. 3, is shown in FIG. 6 with an aerial image 600 that is overlaid with indications of various user location data points. In this case, while the majority of data points corresponding to the two locations of interest shown with edges 620 and 630 are in distinct physical areas 620a and 630a, respectively, there are many points originating from one location overlapping with the other, such as due to noise. FIG. 7 shows an aerial image 700 similar to that of image 600 of FIG. 6, with various contour lines shown for two example LSMs indicated with edges 720 and 730, respectively, which are detected and learned for this pair of locations—in such cases, the two location models themselves may naturally overlap (although such overlap is not illustrated here), such as to reflect overlap of the observed GPS signatures of the two locations. In particular, in the example of FIG. 7, the model contour lines for the left house are shown in yellow, and the model contours for the right house are shown in blue, with the edges 720 and 730 being identified using the described multiple location-clustering heuristic (in this example, both LSMs have some probability density in the regions of the physical location of the other).

Nearest POI Matching

The LSM or other location model for a location of interest allows a generally irregular radius to be specified, and thus allows irregular search criteria to be specified for lookup of a nearest POI in base map data. However, location-based service APIs often facilitate only radius-based search, Nonetheless, a nearest POI may be efficiently identified using the irregularity of the location as described by an LSM or other location model, such as by using a polygonal decomposition of an area at a high spatial granularity to model irregularity in the location shape, thus allowing an irregular search radius (albeit confined to the granularity and base-shape of the polygons). Additional details related to such polygon decomposition are included in U.S. Provisional Application No. 60/911,627, filed Apr. 13, 2007 and entitled "Location-Based Information Determination," and in U.S. application Ser. No. 12/082,836, filed Apr. 14, 2008 and entitled "Location-Based Information Determination," each of which is hereby incorporated by reference in its entirety. To populate polygons with membership of a location, a Monte Carlo sample of points from a LSM may be made, with each polygon containing a sample point receiving the attribution of membership of the location. For radius-based search, the polygon hierarchy will already be populated with which POIs are contained within them, and so POIs can be linked to location by common attribution of a polygon. In addition, in the case of multiple matches, POI-matches can be ranked by likelihood, such as by
computing the probability mass of the LSM for the location in the polygons containing the POIs, as is illustrated in FIG. 8.

Figure 8:
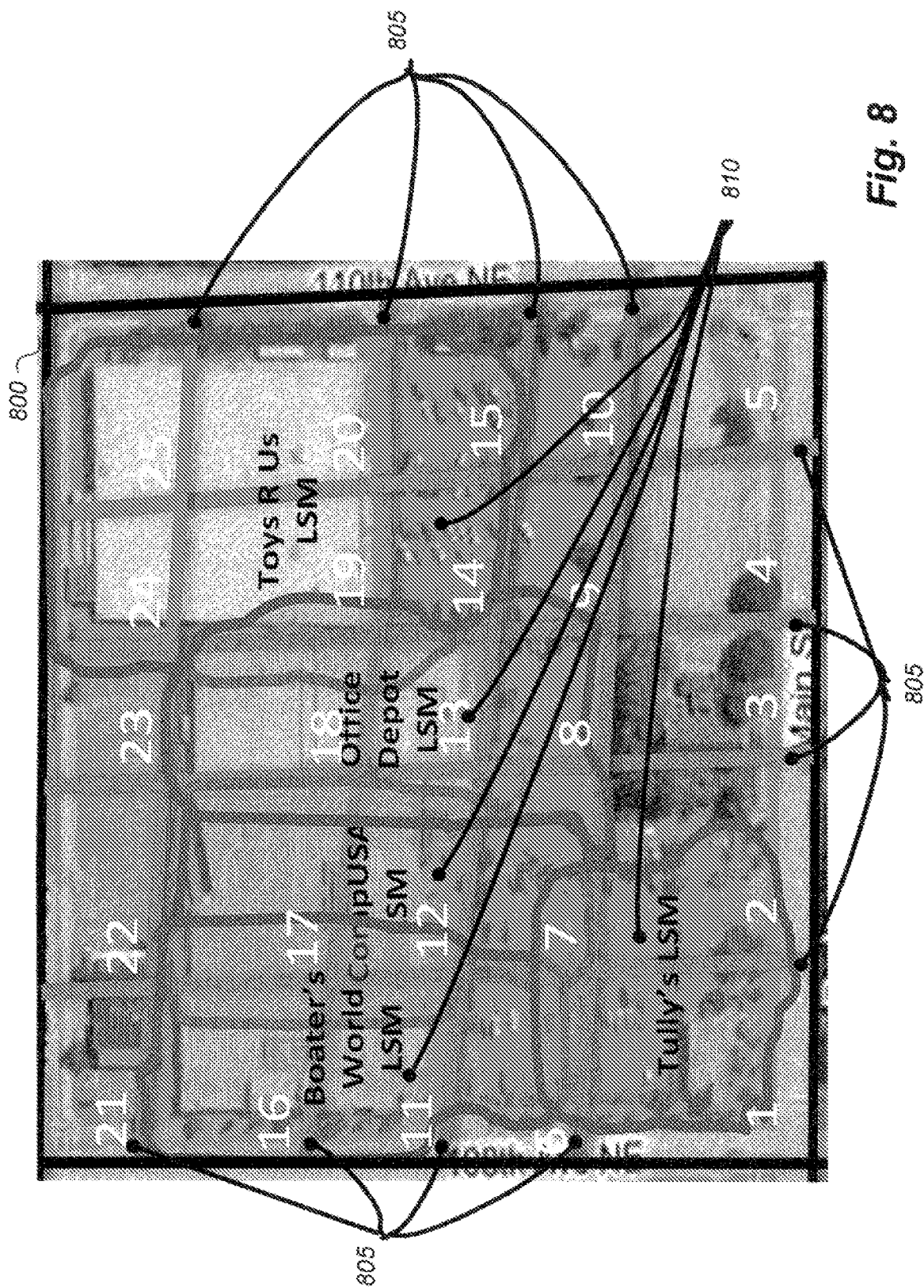

In particular, FIG. 8 illustrates a geographic area 800 corresponding to a city block with multiple points of interest (in this example, businesses) that each have a corresponding illustrated LSM, and provides an example of polygon decomposition of the geographic area. In FIG. 8, a larger geographic area (e.g., at the level of a city, county or other region, state, etc.) is divided into polygons at the street block-level (in black, with a single square block illustrated in this example), and subdivided into 25 numbered smaller polygons with red edges 805. Overlaid in translucent blue are irregularly shaped LSMs 810 for each of 5 businesses in the block, which in this example are Toys 'R' Us, Office Depot, CompUSA, Boater's World and Tully's. In a case where POI geocodes are sufficiently accurate that each POI is geocoded sufficiently close to its physical location, a lookup relationship between LSM and POI may be as follows:

| POI | PolygonIDs | LSM PolygonIDs |
|---|---|---|
| Tully's | 1 | 1, 2, 6, 7 |
| Boater's World | 11, 16 | 6, 7, 11, 12, 16, 17 |
| CompUSA | 12, 17 | 6, 7, 11, 12, 16, 17 |
| OfficeDepot | 13, 18 | 7, 8, 9, 12, 13, 14, 17, 18, 19 |
| Toys R Us | 19, 20, 24, 25 | 13, 14, 15, 18, 19, 20, 23, 24, 25 |

In some embodiments, the address geocodes for Tully's, Boater's World, CompUSA and Office Depot may not be contained within polygons common to those containing the LSM of the location; for example, they may each be at the lower left corner of polygon 1 (each has the same address, that being 100 100$^{th}$ Ave NE, Bellevue, WA), while Toys 'R' Us (with address 103 110$^{th}$ Ave NE, Bellevue, WA) may be geocoded to the lower right corner of polygon 5. In such a case, the self reports of users labeling the LSM with the name of the physical location to which it corresponds may be used in combination with a 'nearest' named POI search to identify the POI and assign a more appropriate Polygon ID and hence geocode. For example, an LSM may be used to help generate a set of nearest named PoIs in a map database (e.g., in this example, using some or all of "Tully's," "Boater's World," "CompUSA," "Office Depot" and "Toys 'R' Us" for one of the LSMs in the black block-level polygon) as candidates for the name of the location that corresponds to the LSM, which can then be refined by taking input from the users of mobile location-enabled devices (whose locations are being tracked) about which POIs they actually visited from a short list of candidates—this provides a 'self-reported' label against which assignments of LSMs to actual POI names may be determined, Assignment of a Visit to a Location Given the LSMs of a set of neighboring locations, and the observed noise in location points associated with a current visit, it is possible to compute the likelihood of a specific visit, identified in a user path, and to rank likely visited locations from a multiplicity of spatially distinct (but noise-overlapping) locations. By Bayes' Theorem we can represent the conditional probability density of a visit being to location $L_v$ given an observed visit $VL_1$ as follows.

$$p(L_v|VL_t) = \frac{p(VL_t|L_v)p(L_v)}{p(VL_t)}$$

Where $p(VL_t|L_v)$ is our LSM for location $L_v$, expressed as the sum of Gaussian distributions modeling the noise in each i of N observed user visits to location $L_v$:

$$p(VL_t|L_v) = \sum_{i=1}^{N} \alpha_i \mathcal{N}(\vec{\mu_L}, \sum_i)$$

The density is normalized via the mixture coefficients $\alpha_i$ which may be chosen to weight each equally, or in proportion to the number of location data points describing each visit, or using a hierarchical Bayesian prior model over the coefficients and learning from the observed data; $p(L_v)$ represents the prior probability distribution of visits to $L_v$ or its 'popularity' which we can approximate by the to-date observed frequency of visits and refine as likely new visits are detected, while $p(VL_l)$ is the prior distribution of visits by the specific user to the location.

For the given group of data points $\{\vec{x_k}\}$ modeled as a spatial distribution with mean $\vec{v_l}$ and covariance, matrix $C_l$ in the user-visit, the probability of those points corresponding to a visit of location $L_v$ (using the independence of the current visit to the location from the multiplicity of historical visits used to learn the LSM) is then given by the overlap integral;

$$P(VL_t|L_v)P(L_v) = \int_{-\infty}^{\infty} \frac{1}{2\pi\sqrt{\det(C_l)}} \exp\left(-\frac{1}{2}(x-\vec{v_l})^T C_l^{-1}(x-\vec{v_l})\right)$$

$$\sum_{i=1}^{N} \alpha_i \frac{1}{2\pi\sqrt{\det(\sum_i)}} \exp\left(-\frac{1}{2}(x-\vec{\mu_1})^T \sum_i^{-1} (x-\vec{\mu_1})\right),$$

$$dx = \sum_{i=1}^{N} \alpha_i \frac{1}{(2\pi)^{\frac{d}{2}}} \sqrt{\frac{\det\left(C_l^{-1} + \sum_i^{-1}\right)^{-1}}{\det(C_l)\det(\sum_i)}}$$

$$\exp\left[-\frac{1}{2}\left(\vec{v_l}^T C_l^{-1} \vec{v_l} + \vec{\mu_i}^T \sum_i^{-1} \vec{\mu_i} + \gamma^T \left(C_l^{-1} + \sum_i^{-1}\right)\gamma\right)\right] \text{ where } \gamma =$$

$$\left(C_l^{-1} + \sum_i^{-1}\right)^{-1} C_l^{-1} v_l + \left(C_l^{-1} + \sum_i^{-1}\right)^{-1} \sum_i^{-1} \vec{\mu}$$

This is one way to measure the "likelihood of visit $VL_l$ being to location $L_v^\alpha$, and can then rank locations by their likelihood for the current visit yielding a shortlist of locations (with or without mapping to POIs) to present to the user for self reporting and/or confirmation of the location visited. With respect to Gaussian identities, consider the products of two Gaussian Distributions, then;

$$\mathbb{N}_{(a,A)} \cdot \mathbb{N}_{(b,B)} \propto \mathbb{N}_{(c,C)}$$

such that;

$C=(A^{-1}+B^{-1})^{-1}$ and $CA^{-1}a+CB^{-1}b$

Then the full-space integral of the product of the two Gaussians in N dimensions is given by;

$$\frac{1}{(2\pi)^{\frac{N}{2}}} \sqrt{\frac{\det(C)}{\det(A)\det(B)}} \exp\left[-\frac{1}{2}\left(a^T A^{-1} a + b^T B^{-1} b + c^T C^{-1} c\right)\right]$$

For additional details, see Roweis, S, Gaussian Identities, July 1999, http://www cs.toronto.edu/~roweis/notes.html.

Figure 9:
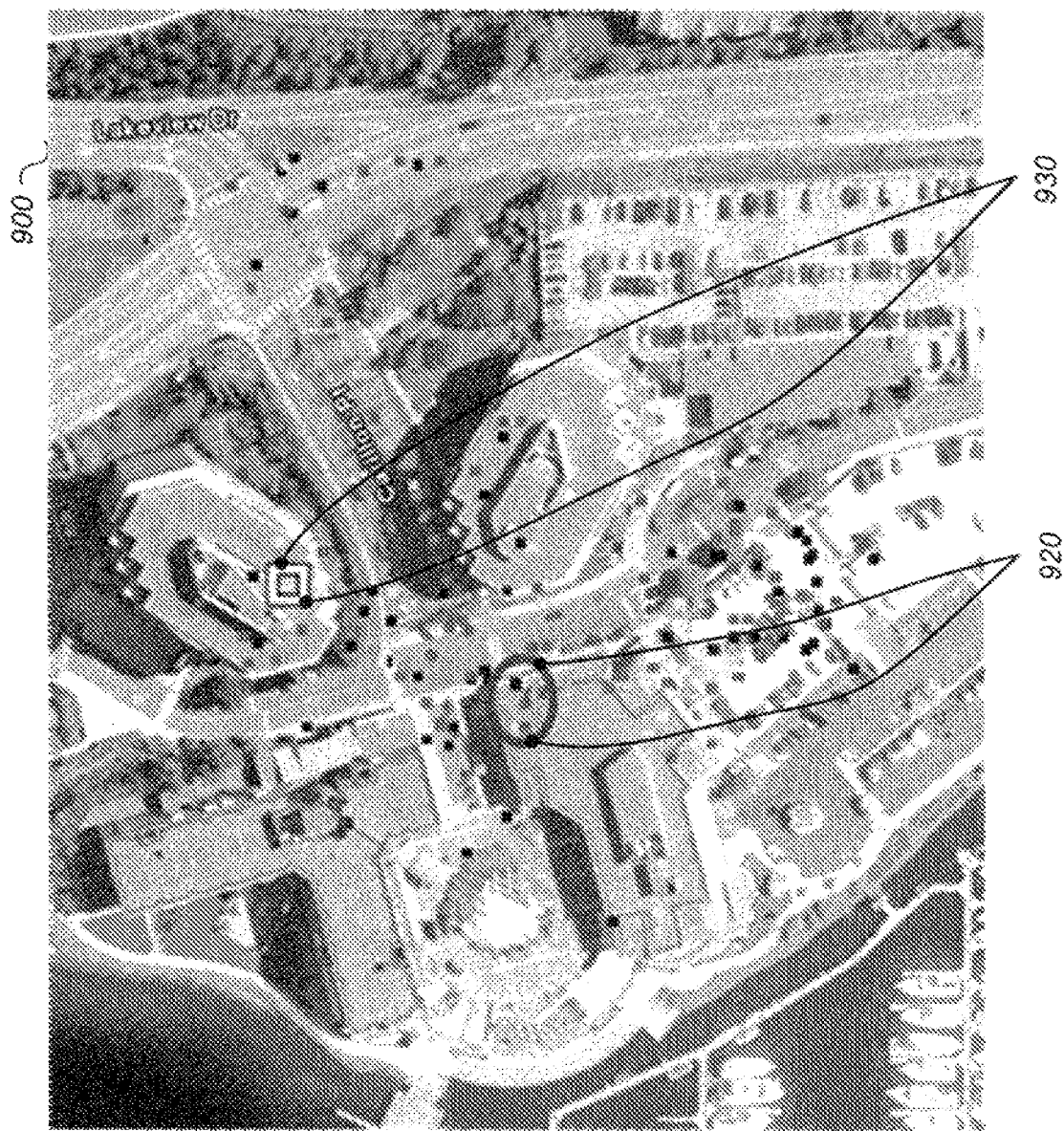

Most significantly for visit identification, it matters only that GPS points corresponding to a given visit of a location are consistent with the LSM of that location, irrespective of whether either correspond geographically to the precise location in question. This allows the approach to be robust to the multipath and building penetration problems that can affect GPS in urban environments, an example of which is shown in the image 900 of FIG. 9, in which the reported location data points and corresponding location model (shown as a white box 930) are geographically removed from the actual location (shown in the blue oval 920) of the point of interest represented by the location model.

Controlling Complexity of the LSM

With over ten million POIs available in commercial map database products today, and the additional multitude of residential locations that people occupy and visit daily intersected, it is foreseeable to expect to learn tens of millions of LSMs. Assuming M visits to each location, the number of Gaussians in the naïve LSM representation would grow without bound in proportion to M. In such a scenario, it would be beneficial to reduce the complexity of the LSM by reducing the number of individual Gaussians used to represent the model.

One such method for doing so, while retaining the tractability of the sum-of-Gaussians representation, would be to learn an approximation to the LSM, limited to a fixed number of Gaussians, K. This can be achieved using a variety of different approaches, including coalescing Gaussians with 'close' mean and covariance matrices, or using unsupervised learning methods (e.g., the k-means algorithm or Expectation-Maximization) to learn a constrained sum of Gaussians model for each LSM using all data points comprising a detected visit to the location as the training dataset.

Use of Identified LSMs and POIs

As previously noted, automatically identifying locations of interest and user visits provides a variety of benefits. In some embodiments, the described techniques may further be used to assist in identifying locations associated with advertisements that may be made available to mobile users and/or to assist in identifying when users whose receive such advertisements subsequently visit corresponding locations. Additional details related to such advertising-related uses are included in U.S. application Ser. No. 11/404,102, filed Apr. 13, 2006 and entitled "Pay-for-Visit Advertising Based on Visits to Physical Locations;" which is hereby incorporated by reference in its entirety.

Visitization System Diagram

Figure 10:
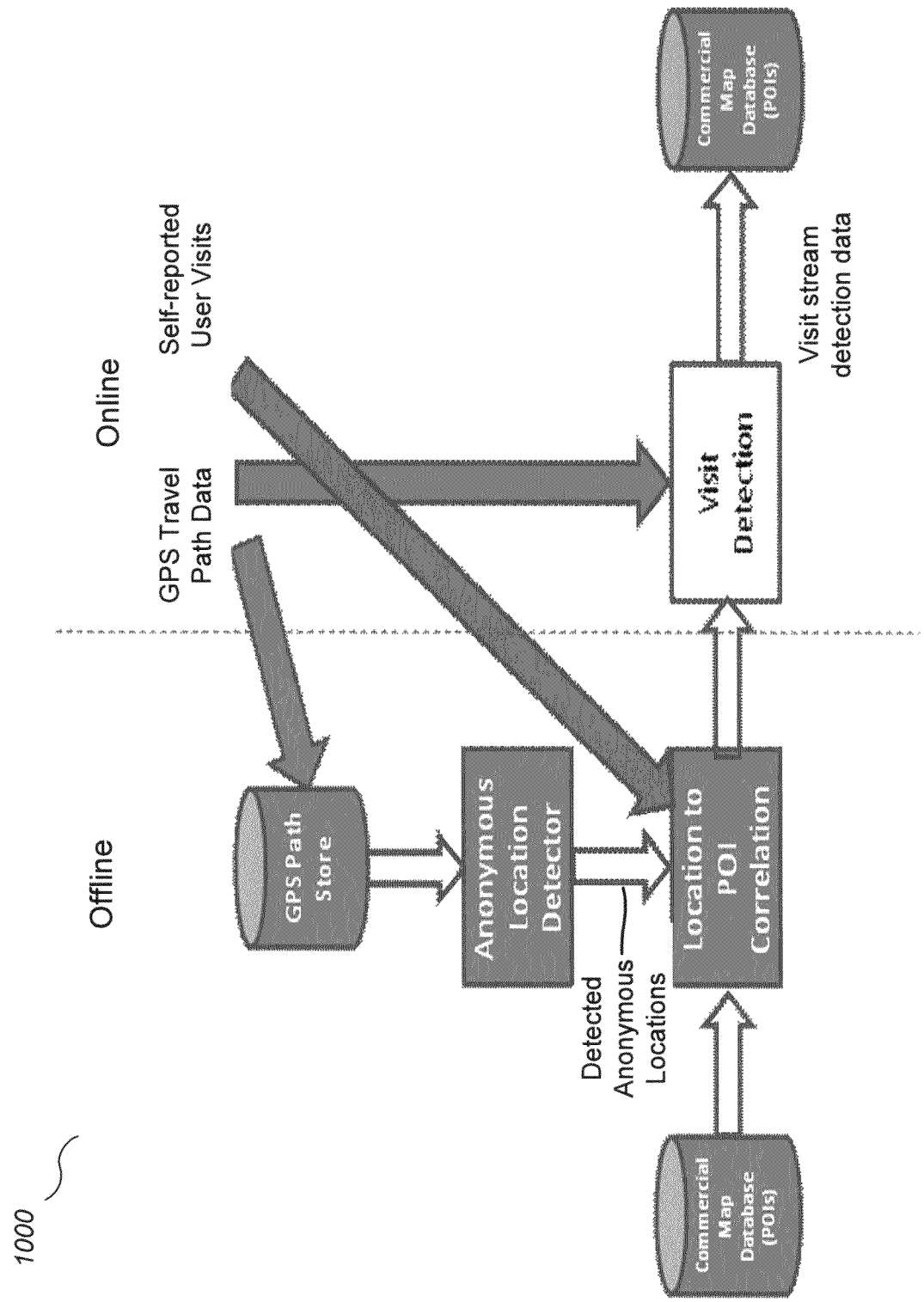
FIG. 10 illustrates an example high-level architecture of a system capable of generating location models for points of interest and of identifying user visits to points of interest.

FIG. 10 provides an illustration of an example high-level architecture and data flow 1000 of an embodiment of a visitization system able to learn LSMs and to detect individual visits to locations, such as may be performed in at least some embodiments in a realtime or near-realtime manner. The example visitization system receives GPS travel path data and, asynchronously, self-reports of user visits to locations, and includes various components and data flows as shown.

Figure 11:
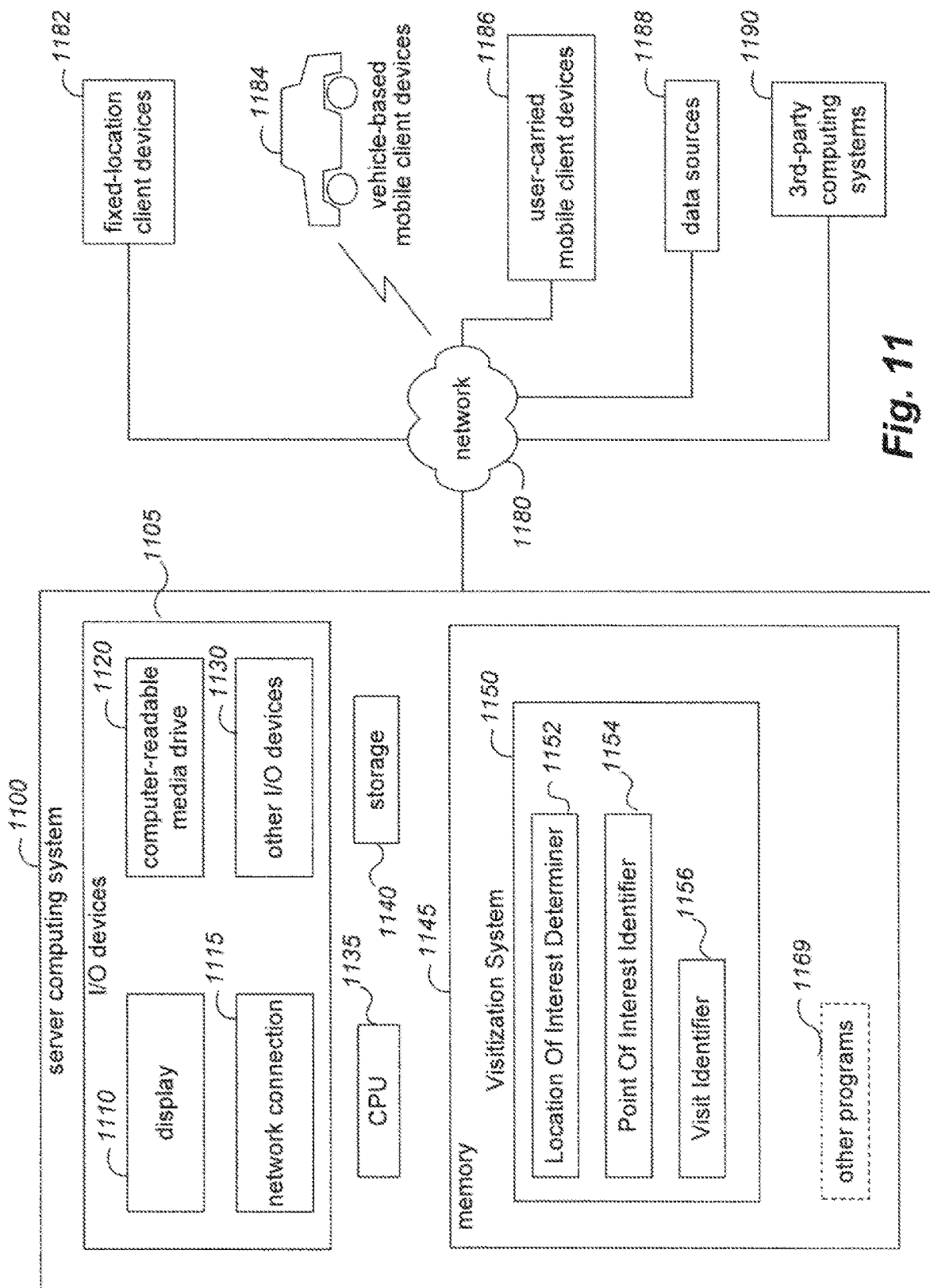
FIG. 11 is a block diagram illustrating a computing system suitable for executing an embodiment of a system that performs at least some of the described techniques.

FIG. 11 is a block diagram illustrating an embodiment of a computing system 1100 that is suitable for performing at least some of the described techniques, such as by executing an embodiment of a visitization system, here shown as Visitization system 1150. The computing system 1100 includes a central processing unit ("CPU") 1135, various input/output ("I/O") components 1105, storage 1140, and memory 1145, with the illustrated I/O components including a display 1110, a network connection 1115, a computer-readable media drive 1120, and other I/O devices 1130 (e.g., keyboards, mice or other pointing devices, microphones, speakers, etc.). The computing system 1100 and system 1150 may communicate with other computing systems via a network 1180 (e.g., the Internet, one or more cellular telephone networks, etc.), such as various fixed-location client devices 1182, vehicle-based mobile clients 1184, user-carried mobile client devices 1186, data sources 1188, and third-party computing systems 1190.

In the illustrated embodiment, the Visitization system 1150 executes in memory 1145 in order to perform at least some of the described techniques, such as to automatically determine locations of interest and to identify user visits to such locations. In particular, in this example embodiment, the system 1150 may obtain location-related information for users and mobile devices in various ways, such as from vehicle-based mobile clients 1184 and/or user-carried mobile client devices 1186 (e.g., by periodically polling those client devices or otherwise requesting the data from those devices, by those devices initiating sending of the data to the system 1150, by obtaining the data from another data source that receives the data from those client devices, such as one or more data sources 1188, etc.). Such information may be obtained in various ways, including via wireless transmission (e.g., via Wi-Fi, cellular data transmission, satellite transmission, etc.) and/or based on physical transfer via cables/wires, physical transmission media, etc. The system 1150 may also obtain other types of information of interest, such as commercial map database information or other location information about possible POIs, from various sources, such as data sources 1188 and/or the third-party computing systems 1190.

After obtaining location-related information and other related information, the system 1150 uses the data to automatically determine locations of interest and/or to identify user visits to such locations. In this example, the system 1150 includes three components, including an Location Of Interest Determiner component 1152, a Point Of Interest Identifier component 1154, and a Visit Identifier component 1156. The Location Of Interest Determiner component 1152 may use obtained location-related information (e.g., user travel path information) to automatically identify geographic areas that correspond to points of interest, such as by generating LSMs corresponding to locations that users frequent. The Point Of Interest Identifier component 1154 may then identify POIs that correspond to determined LSMs, such as based on user-reported information and/or automatically received information (e.g., transaction information for a user that includes information from which a merchant may be identified and that corresponds to a visit by the user at an LSM). The Visit Identifier component 1156 identifies user visits to POIs and/or LSMs, such as based on travel paths of the users. In other embodiments, one or more of the components may not be present, and/or other components may be provided.

In addition, in this example, one or more optional other programs 1169 may also execute in memory 1145. While not illustrated here, other systems (e.g., systems provided by other programs 1169) may obtain determined information from system 1150 and use the obtained information in various manners, such as to update databases with information about points of interest, to provide ads based on a user visit to a point of interest, to charge for providing ads based on a prior or subsequent user visit to a point of interest, etc. In addition, users of the various clients and/or third-party computing systems may supply requests for location-based information (e.g., by supplying requests for local search information), and may receive appropriate responses from the system 1150 and/or one or more of the other programs 1169.

The various client devices 1182, 1184 and 1186 may take various forms in various embodiments, and may generally include any communication devices and other computing devices capable of making requests to and/or receiving information from the system 1150. For example, the vehicle-based clients 1184 in this example may each be a computing system and/or communication system located within a vehicle that receives data from system 1150. In some cases, the client devices may execute interactive console applications (e.g., Web browsers) that users may utilize to make requests, while in other cases at least some such determined information may be automatically sent to the client devices (e.g., as text messages, new Web pages, specialized program data updates, etc.) from the system 1150.

The data sources 1188 may include a variety of types of sources of data that may be utilized by the system 1150, including map services and/or databases that provide information regarding road networks, such as the connectivity of various roads to one another as well as traffic control information related to such roads (e.g., the existence and location of traffic control signals and/or speed zones).

The third-party computing systems 1190 include one or more optional computing systems that are operated by parties other than the operator(s) of the system 1150, such as parties who receive determined or identified information from the system 1150 and who make use of the data in some manner.

It will be appreciated that the illustrated computing systems are merely illustrative and are not intended to limit the scope of the present invention. Computing system 1100 may be connected to other devices that are not illustrated, including through one or more networks such as the Internet or via the Web. More generally, a "client" or "server" computing system or device may comprise any combination of hardware or software that can interact and perform the described types of functionality, including without limitation desktop or other computers, database servers, network storage devices and other network devices, PDAs, cellphones, wireless phones, pagers, electronic organizers, Internet appliances, television-based systems (e.g., using set-top boxes and/or personal/digital video recorders), and various other consumer products that include appropriate inter-communication capabilities. In addition, the functionality provided by the illustrated systems may in some embodiments be distributed in various components (not shown), and the functionality of the illustrated systems may not be provided and/or other additional functionality may be available.

In addition, while various items are illustrated as being stored in memory or on storage while being used, these items or portions of them can be transferred between memory and other storage devices for purposes of memory management and/or data integrity. Alternatively, in other embodiments some or all of the software systems and/or components may execute in memory on another device and communicate with the illustrated computing system via inter-computer communication. Furthermore, in some embodiments, some or all of the components may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the systems, components or data structures may also be stored (e.g., as software instructions or structured data) on a computer-readable medium, such as a hard disk, a memory, a network, or a portable media article to be read by an appropriate drive or via an appropriate connection. The systems, components and data structures can also be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

Those skilled in the art will appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, synchronously or asynchronously, etc.) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention may be now or later presented in certain claim forms, the inventors contemplate the various aspects of the invention in any available claim form. For example, while only some aspects of the invention may be initially recited as being embodied in a computer-readable medium, other aspects may likewise be so embodied.

What is claimed is:

1. A method for a computing system to determine location-related information of interest, the method comprising:
   for each of a plurality of users in a geographic area, obtaining location data that defines travel paths of the user in the geographic area over a period of time via a GPS-enabled client device, each travel path indicating a sequence of multiple location data points in the geographic area at which the user has traveled with the GPS-enabled client device;
   automatically analyzing the location data that defines the travel paths of the plurality of users so as to identify multiple distinct subareas of the geographic area that are frequent destinations of the plurality of users during the period of time, each subarea being identified as a frequent destination based at least in part on the location data points of the travel paths of the plurality of users indicating at least a predefined-minimum number of multiple user visits to the subarea that are each of a duration of time that exceeds a predefined minimum length;
   for one of the identified subareas of the geographic area, identifying a business whose location is represented by the identified subarea, such that the multiple user visits that are used to identify the subarea correspond to user visits to the identified business; and
   after the identifying of the business, obtaining information about one or more location data points within the geographic area that an indicated user has visited at a time after the identifying of the business, and automatically determining that the indicated user has visited the identified business based on at least one of the one or more location data points being within the identified subarea for the identified business.

2. The method of claim 1 wherein the identifying of the one subarea that represents the location of the identified business further includes automatically determining approximate boundaries of the identified business based on the location data points of the travel paths of the plurality of users that indicate the user visits to the one subarea, wherein the determining that the indicated user visits the identified business is based on the at least one of the one or more location data points being within the determined approximate boundaries of the identified one subarea, and wherein the method further comprises, after the determining that the indicated user visits the identified business, providing an indication of the determined visit to the identified business by the indicated user for use in future interactions with at least one of the indicated user and the identified business.

3. The method of claim 1 wherein the obtaining of the information about the travel paths of the plurality of users includes obtaining the information via wireless transmissions from the GPS-enabled client devices of the users, wherein the automatic analyzing of the obtained information about the travel paths of the plurality of users includes automatically identifying destinations along the travel paths of each of the plurality of users at which the user spent at least the predefined minimum length of time, each identified destination being associated with one or more location data points from the travel path of the user, and wherein the identifying of the one subarea that represents the location of the identified business further includes generating a location model to represent the one subarea based at least in part on the one or more location data points associated with multiple identified destinations of the plurality of users that are within a defined proximity of each other at the identified one subarea, the generated location model specifying the determined approximate boundaries.

4. The method of claim 3 wherein the method further comprises automatically obtaining information from one or more users whose travel paths each include at least one of the multiple identified destinations that are within the defined proximity of each other at the identified one subarea, the obtained information from each user including a user-supplied name of a point of interest visited by the user that corresponds to the at least one identified destination of the user, wherein the identifying of the business whose location is represented by the identified one subarea includes obtaining information about locations of multiple businesses that are points of interest and about multiple other points of interest that are not businesses and includes automatically selecting the identified business for the identified one subarea based at least in part on the location of the identified business being within the generated location model for the one subarea and includes associating at least one of the user-supplied names from the one or more users with the identified business, and wherein the method further comprises identifying one or more points of interest for each of at least some other of the identified subareas of the geographic area based at least in part on the obtained information about the locations of the multiple business points of interest and multiple other points of interest.

5. A computer-implemented method for determining location-related information of interest, the method comprising:
for each of one or more users in a geographic area, obtaining location data that defines travel paths comprising multiple locations of the user in the geographic area over a period of time based on the user moving within the geographic area;
automatically analyzing the obtained location information for the one or more users to identify one or more distinct subareas of the geographic area that are destinations of interest of the one or more users, each subarea being identified as a destination of interest based at least in part on the obtained location data reflecting multiple user visits to one or more locations within the subarea such that the multiple user visits satisfy one or more specified criteria;
for each of at least one of the identified subareas of the geographic area, identifying a point of interest located at the identified subarea, such that at least some of the multiple user visits that are used to identify the subarea correspond to user visits to the identified point of interest; and providing one or more indications of, for each of one or more of the at least one identified points of interest, the identified subarea that corresponds to the point of interest.

6. The method of claim 5 further comprising, after the identifying of the point of interest for each of the at least one identified subareas, obtaining information about one or more locations within the geographic area that an indicated user visits, and automatically determining that the indicated user visits one of the identified points of interest by determining that at least one of the one or more locations is within the identified subarea for the one identified point of interest.

7. The method of claim 6 wherein the providing of the one or more indications of the identified subarea for each of the at least one identified points of interest includes providing an indication that a user visited the one identified point of interest.

8. The method of claim 6 wherein the providing of the one or more indications of the identified subarea for each of the at least one identified points of interest includes providing an indication that the indicated user visited one of the at least one identified points of interest.

9. The method of claim 5 wherein the providing of the one or more indications of the identified subarea for each of the at least one identified points of interest includes initiating storage of information about that identified subarea for later use in identifying user visits to that identified point of interest based on user locations at that identified subarea.

10. The method of claim 5 wherein the providing of the one or more indications of the identified subarea for each of the at least one identified points of interest includes providing information for one of the at least one identified points of interest for use in identifying that one identified point of interest distinctly from other of the identified points of interest.

11. The method of claim 10 wherein the provided information for the one identified point of interest includes a defined name of the one identified point of interest.

12. The method of claim 10 wherein the provided information for the one identified point of interest includes a label for the one identified point of interest that is provided by one or more users.

13. The method of claim 10 wherein the identifying of the one point of interest located at one of identified subareas includes obtaining information about a location of each of one or more candidate points of interest, the one or more candidate points of interest including the one point of interest, and determining that the location of the one point of interest corresponds to the one identified subarea.

14. The method of claim 10 wherein the identifying of the one point of interest located at the one identified subarea includes, for a user whose obtained information indicates one or more locations at the one identified subarea, obtaining information from that user that includes an identification of one or more points of interest located at the one identified subarea, the one or more points of interest including the one point of interest.

15. The method of claim 14 wherein the obtaining of the information from the user that includes the identification of the one or more points of interest located at the one identified subarea includes providing information to the user to indicate at least one candidate point of interest for the one identified subarea and obtaining a confirmation from the user of one or more of the at least one candidate points of interest as being among the one or more points of interest located at the one identified subarea.

16. The method of claim 5 wherein one or more of the identified points of interest is a business.

17. The method of claim 5 wherein the identifying of a subarea of the geographic area as being a destination of interest based at least in part on the multiple user visits to one or more locations within the subarea that satisfy one or more specified criteria includes identifying a quantity of user visits that exceeds a defined threshold, the defined threshold being at least one of the one or more specified criteria.

18. The method of claim 5 wherein the identifying of a subarea of the geographic area as being a destination of interest based at least in part on the multiple user visits to one or more locations within the subarea that satisfy one or more specified criteria includes identifying one or more user visits of a length of time that exceeds a defined threshold, the defined threshold being at least one of the one or more specified criteria.

19. The method of claim 5 wherein the identifying of a subarea of the geographic area as being a destination of interest based at least in part on the multiple user visits to one or more locations within the subarea that satisfy one or more specified criteria includes identifying a quantity of distinct users who visit the subarea that exceeds a threshold, the threshold being at least one of the one or more specified criteria.

20. The method of claim 5 wherein the identifying of a subarea of the geographic area as being a destination of interest based at least in part on the multiple user visits to one or more locations within the subarea that satisfy one or more specified criteria includes generating a location model to represent the identified subarea, the location model being generated based on multiple locations of one or more of the users during the multiple user visits.

* * * * *